(12) United States Patent
Sajwaj et al.

(10) Patent No.: US 10,802,136 B2
(45) Date of Patent: Oct. 13, 2020

(54) WATER NETWORK MONITORING SYSTEM

(71) Applicant: Rezatec Limited, Reading (GB)

(72) Inventors: Todd Sajwaj, Reading (GB); Louise Bermingham, Reading (GB); Andrew Carrel, Reading (GB)

(73) Assignee: Rezatec Limited, Reading (GB)

( * ) Notice: Subject to any disclaimer, the term of this patent is extended or adjusted under 35 U.S.C. 154(b) by 347 days.

(21) Appl. No.: 15/654,636

(22) Filed: Jul. 19, 2017

(65) Prior Publication Data

US 2019/0025423 A1 Jan. 24, 2019

(51) Int. Cl.
| | |
|---|---|
| *G01S 13/90* | (2006.01) |
| *E03B 7/00* | (2006.01) |
| *G01M 3/38* | (2006.01) |
| *G01M 3/40* | (2006.01) |
| *G01S 13/86* | (2006.01) |

(52) U.S. Cl.
CPC .......... *G01S 13/9023* (2013.01); *E03B 7/003* (2013.01); *G01M 3/38* (2013.01); *G01M 3/40* (2013.01); *G01S 13/867* (2013.01)

(58) Field of Classification Search
None
See application file for complete search history.

(56) References Cited

U.S. PATENT DOCUMENTS

| | | |
|---|---|---|
| 2016/0282463 A1 | 9/2016 | Guy et al. |
| 2017/0067233 A1* | 3/2017 | Farahat .................. E03B 7/074 |
| 2018/0224550 A1* | 8/2018 | Guy ........................ G01M 3/40 |

FOREIGN PATENT DOCUMENTS

| | | |
|---|---|---|
| EP | 0942274 | 9/1999 |
| FR | 3039646 | 2/2017 |

OTHER PUBLICATIONS

Hadjimitsis et al., "Chapter 6: Detection of Water Pipes and Leakages in Rural Water Supply Networks Using Remote Sensing Techniques," in Remote Sensing of Environment: integrated Approaches, 2013, pp. 155-180.
International Search Report for International (PCT) Patent Application No. PCT/GB2018/052030, dated Oct. 5, 2018, 11 pages.

* cited by examiner

*Primary Examiner* — Whitney Moore
(74) *Attorney, Agent, or Firm* — Sheridan Ross P.C.

(57) ABSTRACT

Embodiments are directed to a water network monitoring system for determining leakage from a network. The water network may comprise any of pipelines, aqueducts, reservoir dams, reservoir embankments and sewers. The present water network monitoring system employs Earth observation data, such as synthetic aperture radar (SAR) data and optical data, collected from a geographical region that includes the water network system of interest. This data is collected over successive time periods and analysed to detect any abnormal changes in the indicators within the area in the vicinity of the water network.

29 Claims, 22 Drawing Sheets

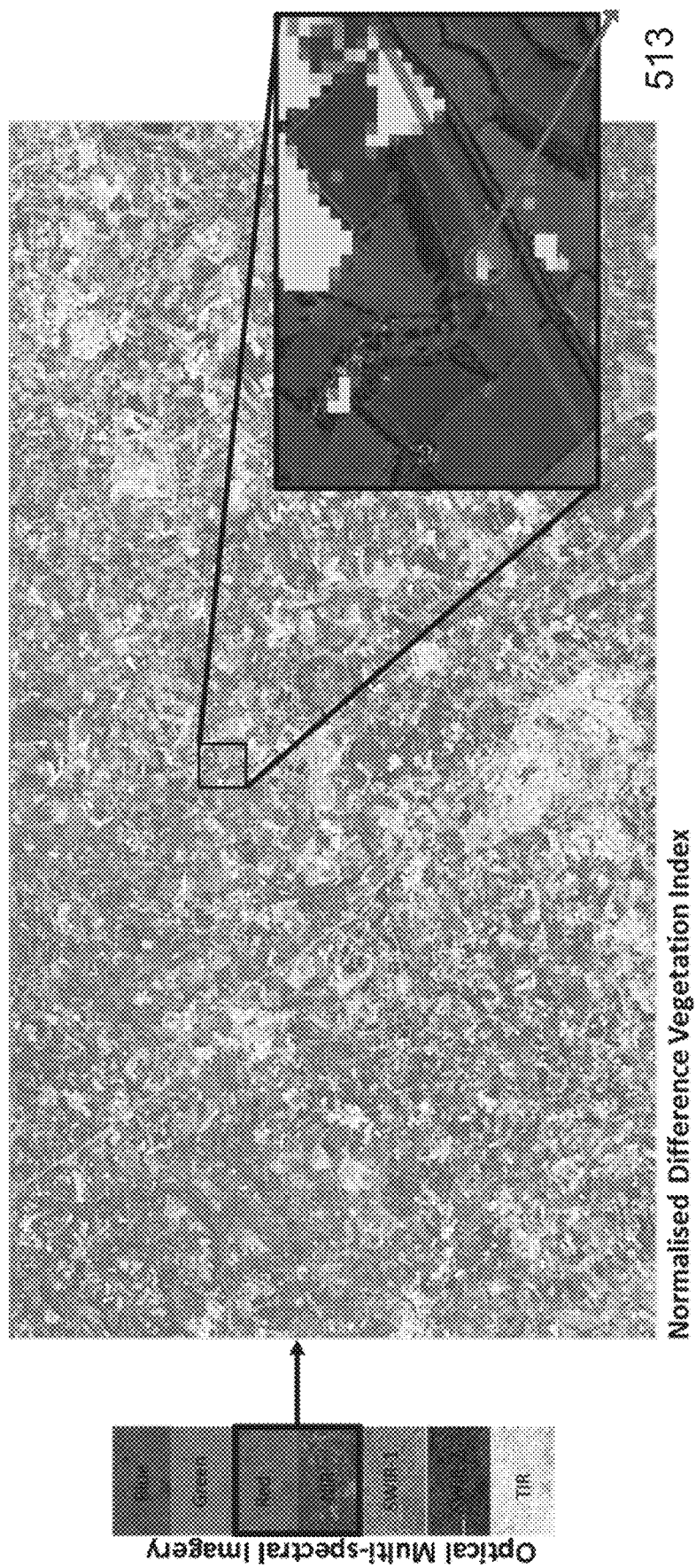

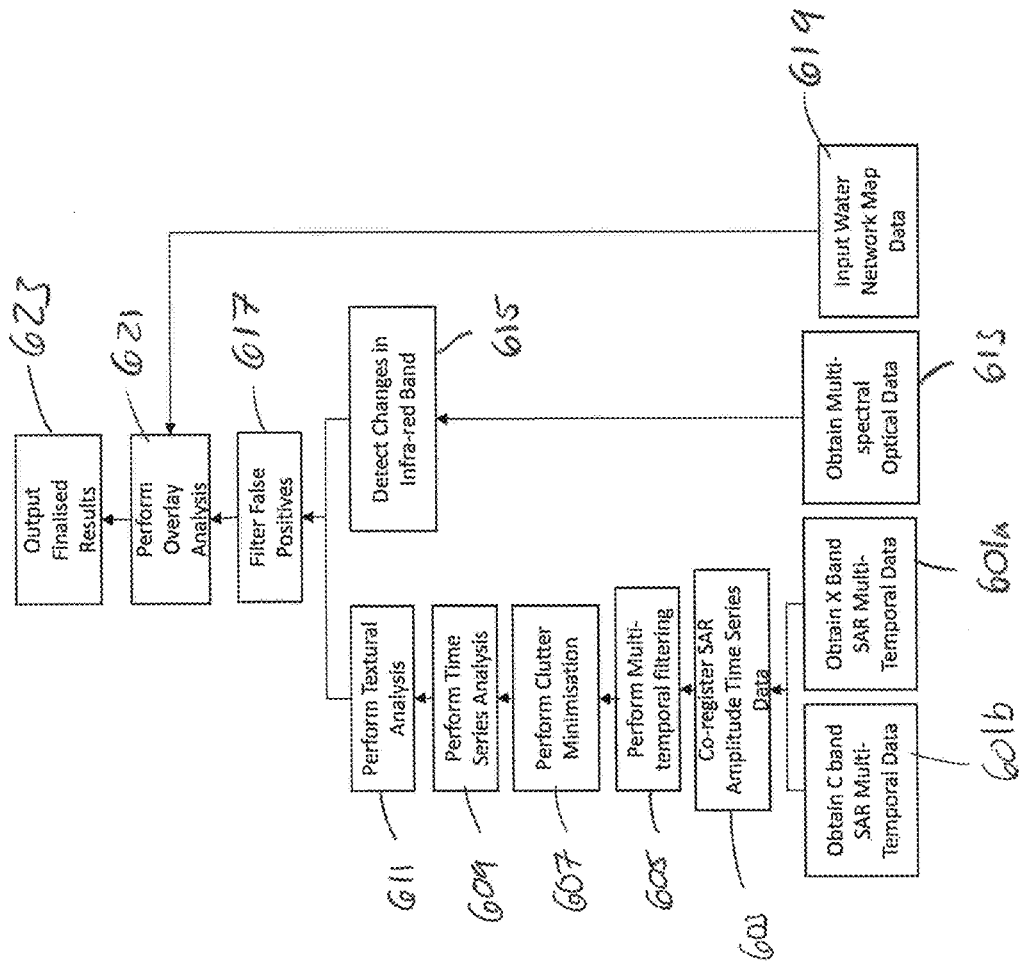

WATER NETWORK MONITORING SYSTEM

FIELD OF THE INVENTION

The present disclosure relates to a water network monitoring system for determining the presence of leaks from a water network and for estimating the likelihood of a leak occurring. This is achieved through the use of earth observations and knowledge of the network.

BACKGROUND OF THE INVENTION

Six billion litres of drinking water are lost globally every day. In the UK, for instance, water utilities estimate this daily loss to total more than 3000 megalitres.

Most of this water loss is due to leakage from pipelines. At present, three methods are used to identify leaks in the pipeline infrastructure of utilities companies: 1) flow/pressure meters located throughout the network, 2) walking surveys that employ manual and/or analogue listening tools, and 3) reports from water users (based on saturated soil or unusually high water bills). Most of this information comes from urban areas where flow meters and water users are concentrated. Reported leaks in urban areas are thus typically reported and repaired within two weeks.

Leaking pipelines are more problematic in rural locations where fewer people and flow meters are located. Leaks in rural locations can go unreported and unrepaired for significant periods of time. In some cases this can be as long as six months, which can lead to significant losses of revenue for utilities companies. These pipeline infrastructure networks are widely distributed across landscapes, often traversing difficult terrain that is infrequently visited.

Therefore, a system which monitors water networks for indications of active leaks and landscape changes that could cause a water network failure (e.g. soil expansion/contraction) is highly desirable.

SUMMARY OF THE INVENTION

According to a first aspect there is provided a method for monitoring a water network, the method comprising: obtaining, by a water network monitoring system, a set of Synthetic Aperture Radar (SAR) data for a geographic region containing at least a portion of the water network; obtaining, by the water network monitoring system, a set of optical data of the geographic region; analyzing, by the water network monitoring system, the obtained set of SAR data and the obtained set of optical data for spatial or temporal anomalies related to a plurality of indirect indicators of leaks in the water network; detecting, by the water network monitoring system and based on the analyzing of the obtained set of SAR data and the obtained set of optical images, one or more spatial or temporal anomalies related to at least one of the plurality of indirect indicators of leaks in the water network and not attributable to environmental factors within the geographic region; and generating, by the water network monitoring system, a set of graded locations within the geographic region having symptoms associated with leaks in the water network based on the detected one or more spatial or temporal anomalies.

The plurality of indirect indicators of leaks in the water network can comprise an indicator of soil moisture or ponding water derived based on the obtained set of SAR data.

The plurality of indirect indicators of leaks in the water network can comprise an indicator of vegetation growth derived based on the obtained set of optical data.

The plurality of indirect indicators of leaks in the water network can comprise an indicator of surface motion or texture change derived based on the obtained set of SAR data.

The method can further comprise detecting, by the water network monitoring system and based on the one or more spatial or temporal anomalies, one or more surface leaks in the water network, the surface leaks comprising a leak of the water network causing ponding of water on a ground surface.

The detecting the one or more surface leaks in the water network can further comprise: filtering noise from the obtained set of SAR data using a multi-temporal filter; identifying one or more locations within the geographic region and corresponding to locations of the water network where the filtered SAR data indicates a drop in backscattered energy relative to at least one previous monitoring period; plotting the identified one or more locations spatially in a graphical representation of the geographic region; overlaying the graphical representation of the geographic region with the plotted one or more locations onto one or more images of the obtained optical data; and filtering the plotted one or more locations based on the one or more images to filter out false positives.

The method can further comprise detecting, by the water network monitoring system and based on the one or more spatial or temporal anomalies, one or more near-surface leaks in the water network, the near-surface leaks comprising a leak of the water network causing water to spread below a ground surface and at or above a level of the water network.

The detecting the one or more near-surface leaks in the water network can further comprise: reading a set of data defining statistical relationships between soil moisture content, SAR interferometric coherence variables and polarimetric decomposition variables obtained from a calibration area of the geographic region; applying the statistical relationships using interferometric coherence variables and polarimetric decomposition variables obtained from SAR data related to portions of the geographic region overlaying the water network using spatial extrapolation to determine a soil moisture content for a plurality of locations in the geographic region; and identifying one or more locations of the plurality of locations in the geographic region having a determined soil moisture content exceeding one or more threshold values.

The method can further comprise creating a set of data defining statistical relationships between soil moisture content SAR interferometric coherence variables and polarimetric decomposition variables obtained from a calibration area of the geographic region.

The method can further comprise detecting, by the water network monitoring system and based on the one or more spatial or temporal anomalies, one or more sub-surface leaks in the water network, the sub-surface leaks comprising a leak of the water network causing water to spread below a ground surface and below a level of the water network.

The detecting the one or more sub-surface leaks in the water network can further comprise: integrating data of the obtained set of SAR data using one or more interferometric processes that quantify vertical terrain movement at one or more locations within the geographic region corresponding to locations of the water network; creating a time series history using the vertical terrain movement at the one or more locations within the geographic region; and identifying, based on the time series history, locations of the one or more locations within the geographic region having vertical terrain movement exceeding one or more threshold values.

According to a second aspect there is provided a method for monitoring a water network, the method comprising: obtaining, by a water network monitoring system, a set of Synthetic Aperture Radar (SAR) data for a geographic region; obtaining, by the water network monitoring system, a set of optical data of the geographic region containing at least a portion of the water network; generating, by the water network monitoring system, an estimate of vegetation intrusion into the water network based at least in part on the obtained set of optical data; monitoring, by the water network monitoring system, an amount of terrain motion around the water network based at least in part on one or both of the obtained set of SAR data and the obtained set of optical data; and generating, by the water network monitoring system, a leakage risk index based at least in part on the estimate of vegetation intrusion into the water network and the monitoring of the amount of terrain motion around the water network.

The generating the estimate of vegetation intrusion into the water network can comprise: reading a set of data defining one or more physical attributes for soil at one or more depths and at the one or more locations along the water network; reading a set of data defining one or more physical attributes for one or more types of vegetation; classifying vegetation at the one or more locations along the water network based on the obtained set of optical data; and generating an estimated amount of vegetation intrusion at each of the one or more locations along the water network based on the one or more physical attributes of the soil, and the one or more physical attributes for a type of the classified vegetation at each location.

The generating the leakage risk index can be based at least in part on data defining one or more physical attributes of the water network at one or more locations in the geographic region.

The monitoring the amount of terrain motion around the water network can comprise: integrating data of the obtained set of SAR data using one or more interferometric processes that quantify vertical terrain movement at one or more locations within the geographic region corresponding to locations of the water network; creating a time series history using the vertical terrain movement at the one or more locations within the geographic region; and identifying, based on the time series history, locations of the one or more locations within the geographic region having vertical terrain movement exceeding one or more threshold values.

The generating the leakage risk index can further comprise: reading a set of data defining one or more threshold values for each of the generated estimate of vegetation intrusion into the water network and the amount of terrain motion around the water network; and assigning a risk category to one or more locations along the water network based on a value for the generated estimate of vegetation intrusion into the water network or a value for the amount of terrain motion around the water network exceeding one or more of the threshold values.

According to a third aspect there is provided a system comprising: a processor; and a memory coupled with and readable by the processor and storing therein a set of instructions which, when executed by the processor, causes the processor to monitor a water network by: obtaining a set of Synthetic Aperture Radar (SAR) data for a geographic region containing at least a portion of the water network; obtaining a set of optical data of the geographic region; analyzing the obtained set of SAR data and the obtained set of optical data for spatial or temporal anomalies related to a plurality of indirect indicators of leaks in the water network; detecting, based on the analyzing of the obtained set of SAR data and the obtained set of optical data, one or more spatial or temporal anomalies related to at least one of the plurality of indirect indicators of leaks in the water network and not attributable to environmental factors within the geographic region; and generating a set of graded locations within the geographic region having symptoms associated with leaks in the water network based on the detected one or more spatial or temporal anomalies.

The plurality of indirect indicators of leaks in the water network can comprise two or more of an indicator of soil moisture or ponding water derived based on the obtained set of SAR data, an indicator of vegetation growth derived based on the obtained set of optical data, or an indicator of surface motion or texture change derived based on the obtained set of SAR data.

The system can further comprise detecting, by the water network monitoring system and based on the one or more spatial or temporal anomalies, one or more surface leaks in the water network, the surface leaks comprising a leak of the water network causing ponding of water on a ground surface and wherein detecting the one or more surface leaks in the water network further comprises: filtering noise from the obtained set of SAR data using a multi-temporal filter; identifying one or more locations within the geographic region and corresponding to locations of the water network where the filtered SAR data indicates a drop in backscattered energy relative to at least one previous monitoring period; plotting the identified one or more locations spatially in a graphical representation of the geographic region; overlaying the graphical representation of the geographic region with the plotted one or more locations onto one or more images of the obtained optical data; and filtering the plotted one or more locations based on the one or more images to filter out false positives.

The system can further comprise detecting, by the water network monitoring system and based on the one or more spatial or temporal anomalies, one or more near-surface leaks in the water network, the near-surface leaks comprising a leak of the water network causing water to spread below a ground surface and at or above a level of the water network and wherein detecting the one or more near-surface leaks in the water network further comprises: reading a set of data defining statistical relationships between soil moisture content, SAR interferometric coherence variables and polarimetric decomposition variables obtained from a calibration area of the geographical region; applying the statistical relationships using interferometric coherence variables and polarimetric decomposition variables obtained from SAR data related to portions of the geographic region overlaying the water network using spatial extrapolation to determine a soil moisture content for a plurality of locations in the geographic region; and identifying one or more locations of the plurality of locations in the geographic region having a determined soil moisture content exceeding one or more threshold values.

The system can further comprise creating a set of data defining statistical relationships between soil moisture content SAR interferometric coherence variables and polarimetric decomposition variables obtained from a calibration area of the geographic region.

The system can further comprise detecting, by the water network monitoring system and based on the one or more spatial or temporal anomalies, one or more sub-surface leaks in the water network, the sub-surface leaks comprising a leak of the water network causing water to spread below a ground surface and below a level of the water network and wherein detecting the one or more sub-surface leaks in the water network further comprises: integrating data of the obtained set of SAR data using one or more interferometric processes that quantify vertical terrain movement at one or more locations within the geographic region corresponding to locations of the water network; creating a time series history using the vertical terrain movement at the one or more locations within the geographic region; and identifying, based on the time series history, locations of the one or more locations within the geographic region having vertical terrain movement exceeding one or more threshold values.

The instructions can further cause the processor to determine a risk of leakage by: obtaining a set of Synthetic Aperture Radar (SAR) data for a geographic region; obtaining a set of optical data of the geographic region containing at least a portion of the water network; generating an estimate of vegetation intrusion into the water network based at least in part on the obtained set of optical data; monitoring an amount of terrain motion around the water network based at least in part on one or both of the obtained set of SAR data and the obtained set of optical data; and generating a leakage risk index based at least in part on the estimate of vegetation intrusion into the water network and the monitoring of the amount of terrain motion around the water network.

The generating the estimate of vegetation intrusion into the water network can comprise: reading a set of data defining one or more physical attributes for soil at one or more depths and at the one or more locations along the water network; reading a set of data defining one or more physical attributes for one or more types of vegetation; classifying vegetation at the one or more locations along the water network based on the obtained set of optical data; and generating an estimated amount of vegetation intrusion at each of the one or more locations along the water network based on the one or more physical attributes of the soil, and the one or more physical attributes for a type of the classified vegetation at each location.

The generating the leakage risk index can be based at least in part on data defining one or more physical attributes of the water network at one or more locations in the geographic region.

The monitoring the amount of terrain motion around the water network can comprise: integrating data of the obtained set of SAR data using one or more interferometric processes that quantify vertical terrain movement at one or more locations within the geographic region corresponding to locations of the water network; creating a time series history using the vertical terrain movement at the one or more locations within the geographic region; and identifying, based on the time series history, locations of the one or more locations within the geographic region having vertical terrain movement exceeding one or more threshold values.

The generating the leakage risk index further can comprise: reading a set of data defining one or more threshold values for each of the generated estimate of vegetation intrusion into the water network and the amount of terrain motion around the water network; and assigning a risk category to one or more locations along the water network based on a value for the generated estimate of vegetation intrusion into the water network or a value for the amount of terrain motion around the water network exceeding one or more of the threshold values.

According to a fourth aspect there is provided a non-transitory computer-readable medium comprising a set of instructions stored therein which, when executed by a processor, causes the processor to monitor a water network by: obtaining a set of Synthetic Aperture Radar (SAR) data for a geographic region containing at least a portion of the water network; obtaining a set of optical data of the geographic region; analyzing the obtained set of SAR data and the obtained set of optical data for spatial or temporal anomalies related to a plurality of indirect indicators of leaks in the water network, wherein the plurality of indirect indicators of leaks in the water network comprises two or more of an indicator of soil moisture or ponding water derived based on the obtained set of SAR data, an indicator of vegetation growth derived based on the obtained set of optical data, or an indicator of surface motion or texture change derived based on the obtained set of SAR data; detecting, based on the analyzing of the obtained set of SAR data and the obtained set of optical data, one or more spatial or temporal anomalies related to at least one of the plurality of indirect indicators of leaks in the water network and not attributable to environmental factors within the geographic region; generating a set of graded locations within the geographic region having symptoms associated with leaks in the water network based on the detected one or more spatial or temporal anomalies; generating an estimate of vegetation intrusion into the water network based at least in part on the obtained set of optical data; monitoring an amount of terrain motion around the water network based at least in part on one or both of the obtained set of SAR data and the obtained set of optical data; and generating a leakage risk index based at least in part on the estimate of vegetation intrusion into the water network and the monitoring of the amount of terrain motion around the water network.

The computer-readable medium can further comprise detecting, by the water network monitoring system and based on the one or more spatial or temporal anomalies, one or more surface leaks in the water network, the surface leaks comprising a leak of the water network causing ponding of water on a ground surface and wherein detecting the one or more surface leaks in the water network further comprises: filtering noise from the obtained set of SAR data using a multi-temporal filter; identifying one or more locations within the geographic region and corresponding to locations of the water network where the filtered SAR data indicates a drop in backscattered energy relative to at least one previous monitoring period; plotting the identified one or more locations spatially in a graphical representation of the geographic region; overlaying the graphical representation of the geographic region with the plotted one or more locations onto one or more images of the obtained optical data; and filtering the plotted one or more locations based on the one or more data to filter out false positives.

The computer-readable medium can further comprise detecting, by the water network monitoring system and based on the one or more spatial or temporal anomalies, one or more near-surface leaks in the water network, the near-surface leaks comprising a leak of the water network causing water to spread below a ground surface and at or above a level of the water network and wherein detecting the one or more near-surface leaks in the water network further comprises: reading a set of data defining statistical relationships between soil moisture content, SAR interferometric coherence variables and polarimetric decomposition variables obtained from a calibration area of the geographical region; applying the statistical relationships using interferometric coherence variables and polarimetric decomposition variables obtained from SAR data related to portions of the geographic region overlaying the water network using spatial extrapolation to determine a soil moisture content for a plurality of locations in the geographic region; and identifying one or more locations of the plurality of locations in the geographic region having a determined soil moisture content exceeding one or more threshold values.

The computer-readable medium can further comprise creating a set of data defining statistical relationships between soil moisture content SAR interferometric coherence variables and polarimetric decomposition variables obtained from a calibration area of the geographic region.

The computer-readable medium can further comprise detecting, by the water network monitoring system and based on the one or more spatial or temporal anomalies, one or more sub-surface leaks in the water network, the sub-surface leaks comprising a leak of the water network causing water to spread below a ground surface and below a level of the water network and wherein detecting the one or more sub-surface leaks in the water network further comprises: integrating data of the obtained set of SAR data using one or more interferometric processes that quantify vertical terrain movement at one or more locations within the geographic region corresponding to locations of the water network; creating a time series history using the vertical terrain movement at the one or more locations within the geographic region; and identifying, based on the time series history, locations of the one or more locations within the geographic region having vertical terrain movement exceeding one or more threshold values.

The generating the estimate of vegetation intrusion into the water network can comprise: reading a set of data defining one or more physical attributes for soil at one or more depths and at the one or more locations along the water network; reading a set of data defining one or more physical attributes for one or more types of vegetation; classifying vegetation at the one or more locations along the water network based on the obtained set of optical data; and generating an estimated amount of vegetation intrusion at each of the one or more locations along the water network based on the one or more physical attributes of the water network, the one or more physical attributes of the soil, and the one or more physical attributes for a type of the classified vegetation at each location.

The generating the leakage risk index can be based at least in part on data defining one or more physical attributes of the water network at one or more locations in the geographic region.

The monitoring the amount of terrain motion around the water network can comprise: integrating data of the obtained set of SAR data using one or more interferometric processes that quantify vertical terrain movement at one or more locations within the geographic region corresponding to locations of the water network; creating a time series history using the vertical terrain movement at the one or more locations within the geographic region; and identifying, based on the time series history, locations of the one or more locations within the geographic region having vertical terrain movement exceeding one or more threshold values.

The generating the leakage risk index can further comprise: reading a set of data defining one or more threshold values for each of the generated estimate of vegetation intrusion into the water network and the amount of terrain motion around the water network; and assigning a risk category to one or more locations along the water network based on a value for the generated estimate of vegetation intrusion into the water network or a value for the amount of terrain motion around the water network exceeding one or more of the threshold values.

BRIEF DESCRIPTION OF THE DRAWINGS

FIG. 5C shows a plot of multi-spectral optical image of the geographical area being observed showing anomalous vegetation vigour;

FIG. 6 is a flow chart showing an example method for detecting surface leaks using the water network monitoring system;

DETAILED DESCRIPTION OF THE PRESENT INVENTION

Figure 1:
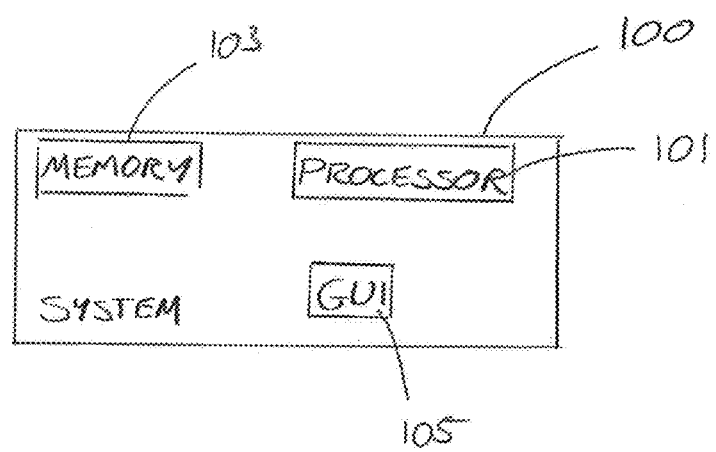
FIG. 1 schematically illustrates an example water network detection system.

Aspects of the present disclosure will now be described by way of example with reference to the accompanying figures.

The following description is presented to enable any person skilled in the art to make and use the system, and is provided in the context of a particular application. Various modifications to the disclosed embodiments will be readily apparent to those skilled in the art.

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

A water network monitoring system is disclosed for determining leakage from a network. The water network may comprise any of pipelines, aqueducts, reservoir dams, reservoir embankments and sewers. Although water networks are broadly described herein, it can be understood that the water network monitoring system may monitor any of pipelines, aqueducts, reservoir dams, reservoir embankments, and sewers.

As water networks such as pipelines, are generally located out of sight, e.g. underground, their direct observation is not usually possible. The present water network monitoring system is designed to pin-point locations adjacent to existing water networks that exhibit abnormal indicators that imply water network leakage, and to identify areas of water network that are at high risk of failure.

The indicators that imply water leakage from a water network may in some instances be an observation of water itself. For instance, ponding of surface water or detected elevated soil moisture. Alternatively, the presence of water may be inferred from the behaviour of the surrounding geographical area, such as through ground subsidence or increased vegetation growth. Where these indicators cannot be attributed to environmental factors, such as the weather, variations in soil type, and/or landscape, and would not usually be expected in such an area, they can be indicative of water network leakage events.

The present water network monitoring system employs Earth observation data, such as synthetic aperture radar (SAR) data and optical data, collected from a geographical region that includes the water network system of interest. This data is collected over successive time periods and analysed to detect any abnormal changes in the indicators within the area in the vicinity of the water network.

One advantage of the water network monitoring system is that it can be implemented with little, to no, need for direct ground based measurements and observations, which can be expensive to implement and maintain.

In addition, the whole water network within the geographical area under investigation can be observed using the Earth observation data. This can enable large landscapes to be mapped. This is unlike using ground based observations, which only have a limited measurement area in which they can detect leaks.

The water network monitoring system is suited for observations of rural water network locations, where the detection of water network leaks can go unnoticed for long periods as few people are likely to come into contact with the leak.

Furthermore, the use of earth observation data is specifically suited to the rural landscape, as it generally provides predictable and uniform trends.

The water network systems under investigation may be clean water networks, where the loss of water is undesirable due to the cost of clean water. The water network systems may also be waste water networks. Waste water network leakage may create a contamination risk. Therefore, it is important that they are detected and acted on quickly due to the potential for environmental damage and associated health and safety risks.

FIG. 1 shows an example water network monitoring system 100. The water network monitoring system 100 comprises a processor 101 for processing instructions, a memory 103 for storing data obtained by the water network monitoring system 100, and a graphical user interface (GUI) 105 for displaying the results obtained from the water network monitoring system 100.

Figure 2:
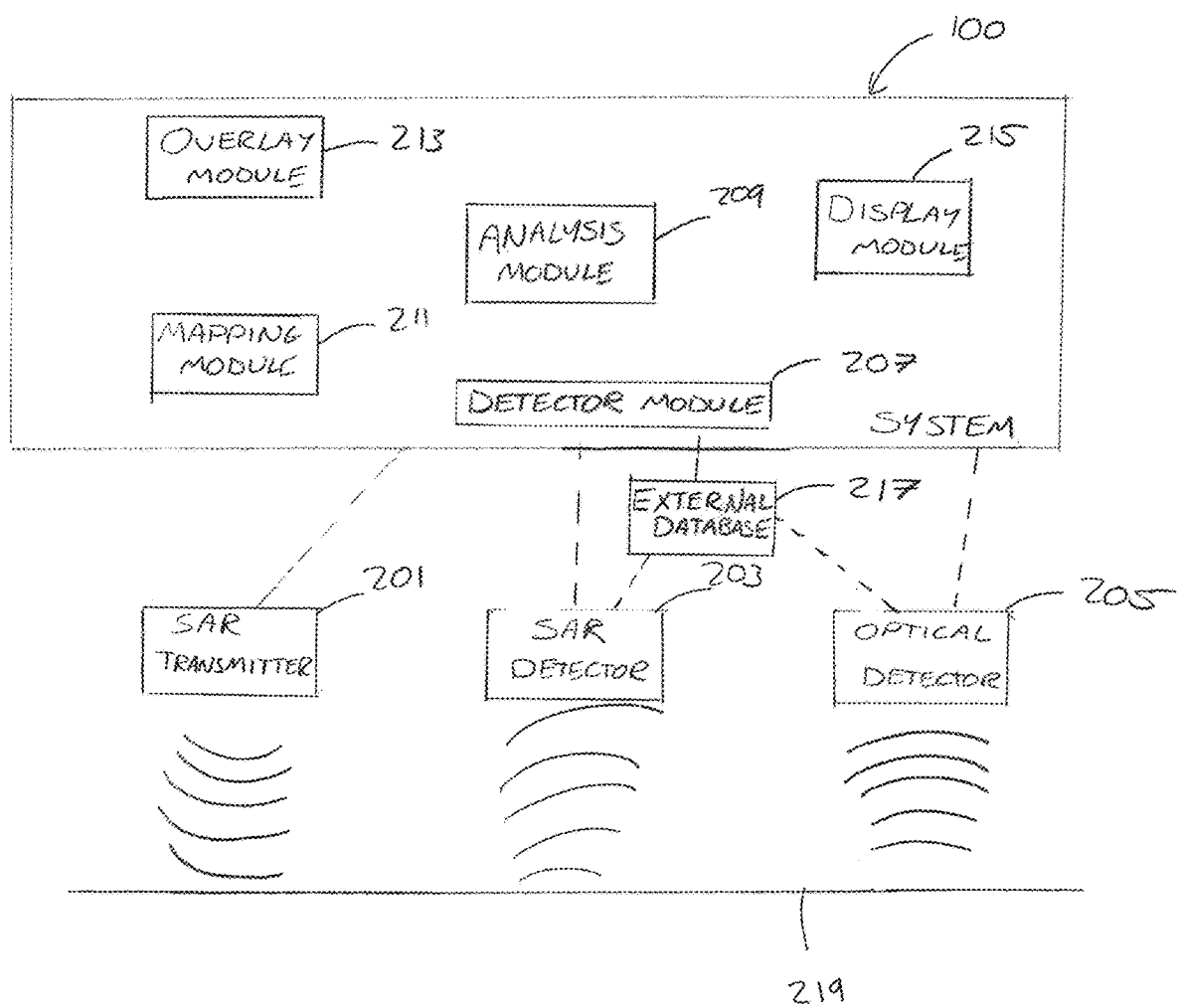
FIG. 2 schematically illustrates an example water network detection system in communication with various devices.

FIG. 2 illustrates the water network monitoring system 100 in communication with SAR transmitter 201 and SAR detector 203. SAR transmitter 201 is responsible for transmitting SAR radiation such that it is incident on the geographical area of interest 219. The SAR radiation backscattered from the geographical region 219 is subsequently detected by SAR detector 203. As would be understood the SAR transmitter and detector may be the same module, or may be separate modules.

SAR actively transmits and receives long wavelengths (i.e. 2.4-30 cm) of energy. This is advantageous as these wavelengths are minimally affected by atmospheric absorption and scattering, meaning data acquisition can occur regularly despite cloud cover. The advantage of using SAR includes the ability to produce fine resolution images that are sensitive to the surface that is being observed.

As mentioned above, SAR uses radiation that is transmitted and then is subsequently detected, after having been reflected from the target. This is in contrast to multispectral optical sensors that require solar illumination to generate useful data.

SAR techniques involve the processing and analysis of two radar observables: the intensity (or amplitude) and phase components of the backscattered signal. Some SAR methods analyse temporal changes to the intensity of returned signal to detect phenomena on the ground while received SAR phase signals can be compared to estimate coherence, or the similarity of phase at different times, or to undertake interferometric processing. Interferometry analyses phase differences between two SAR images to create an interferogram that is used to infer details of the ground under observation.

Water network monitoring system 100 is also in communication with optical detector 205. Optical detector 205 detects visible and/or infra-red energy reflected by the same area as probed using SAR.

The SAR transmitter 201 and SAR detector 203 and the optical detector 205 can be located on satellites. These satellites may include Sentinel 1 (SAR data), Sentinel 2 (optical data), and Landsat 8, or other types of Earth orbiting satellites.

The water network monitoring system 100 may control any of the transmitters and/or detectors to perform the actions outlined above. This may involve any of controlling the transmission of SAR signal, controlling the geographical area of interest to be monitored, or any other parameter that needs to be controlled. Alternatively, the water network monitoring system 100 may request the SAR and optical data from the receivers, or from an external database 217 that may store the data. For instance, this may be data from institutions such as NASA or the European Space Agency or instance using data obtained from any of Sentinel 1 (SAR data), Sentinel 2 (optical data), and Landsat 8. Further examples of databases that the data may be obtained from include any of: Landsat 1-8, Sentinels 1-2, TelespazioVega, CosmoSkyMed, MDA or RapidEye Landsat 8 and Sentinel 2 use pushbroom sensors which comprise a linear array of sensors. Pushbroom scanners use moving mirrors to focus reflected energy onto the different sensors. They continuously scan the Earth's surface in long strips that are then cut into discrete 'scenes' for distribution.

As described herein, 'very high' resolution is sub-5.0 m (meter) pixels, while 'high' resolution is 5-10 m pixels, and 'medium' resolution is 10-40 m pixels. The system may be used with SAR imagery having 3 m pixels (i.e. very high resolution SAR data). The system may also be used with data from any of; Sentinel 1, which has a resolution of 15-20 m pixels (i.e. medium resolution SAR data), data from Sentinel 2 having a resolution of 10 m pixels (i.e. high or medium resolution optical data), and data from Landsat 8 having a resolution of 15-30 m pixels (i.e. medium resolution optical data).

The optical data acquired as outlined above may be multi-spectral imagery. Specifically, each element of the linear sensor array of the optical detector 205 may have a filter such that it can record specific regions of the electromagnetic spectrum. For instance, the satellite Landsat 8 has 11 spectral bands that are recorded. Specifically, 1 to 5 of these bands are in the visible to near IR domain, 3 bands are in the shortwave infrared, and 2 bands are in the thermal IR. There is also a broad panchromatic band collected at a higher spatial resolution (15 m) that can be used to 'sharpen' the other bands.

As can be seen from FIG. 2 water network monitoring system 100 also comprises detector module 207, analysis module 209, mapping module 211, overlay module 213 and display module 215. These modules enable the water network monitoring system 100 to detect water network leakage events as will be described in the methods set out below.

Figure 3:
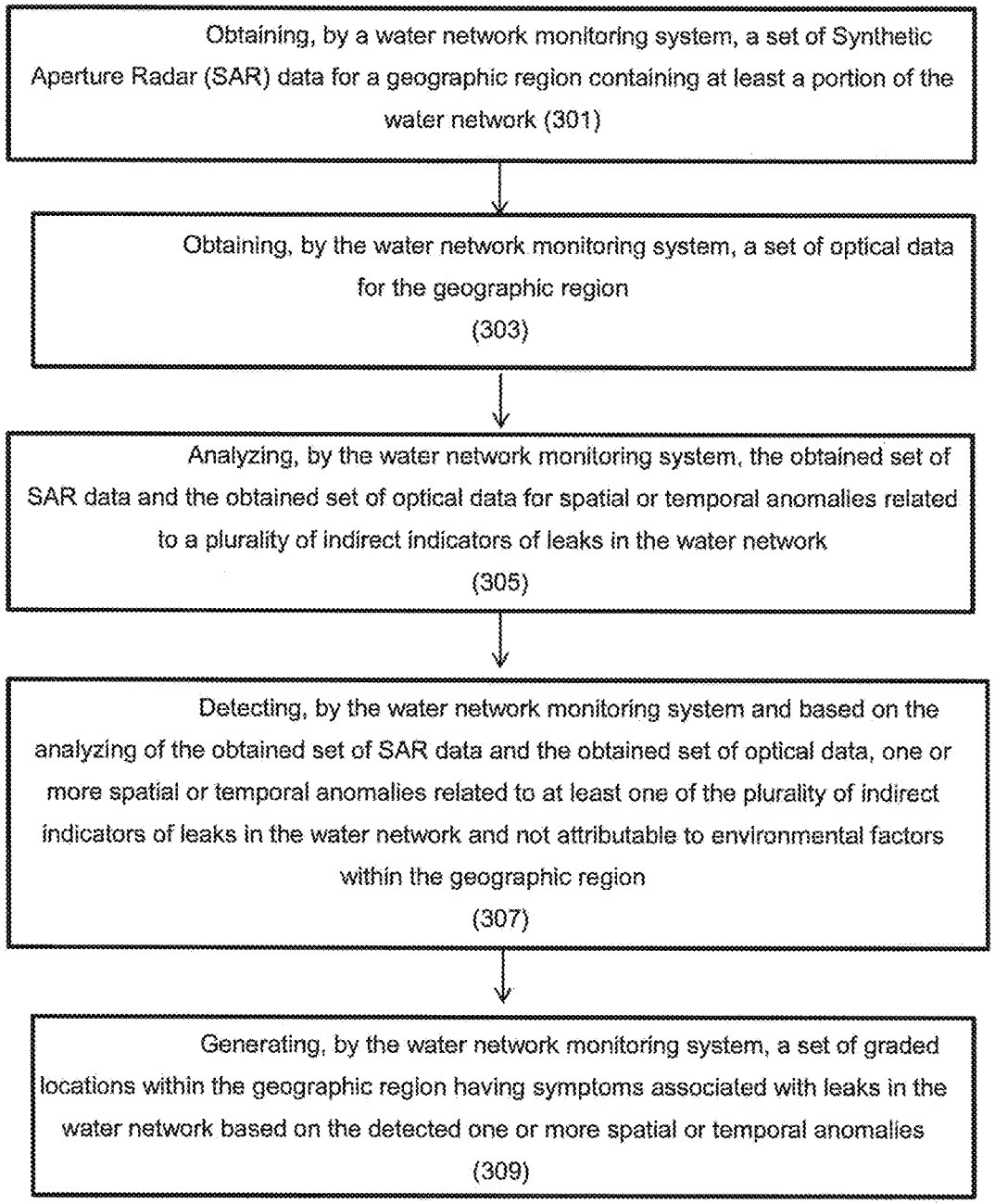
FIG. 3 is a flow chart showing an example method for monitoring a water network using the water network monitoring system.

The flow chart of FIG. 3 shows a method for monitoring a water network, as performed by the water network monitoring system 100 of FIGS. 1 and 2.

Step 301 involves obtaining, by the water network monitoring system 100, a set of SAR data for a geographic region containing at least a portion of the water network.

Step 303 involves obtaining, by the water network monitoring system, a set of optical data of the geographic region.

Both steps 301 and 303 may be performed by the detector module 207 requesting the SAR and optical data from the SAR detector 203 and optical detector 205, respectively. Alternatively, the detector module 207 may automatically be provided with said data from SAR detector 203 and optical detector 205, without having to request the data. Alternatively, the detector module 207 may request the SAR and optical data from the external database 217, where the external database has been provided with the SAR and optical data from the SAR detector 203 and optical detector 205, respectively.

SAR data can take the form of data points, in a list or table, or may take the form of SAR images. Similarly, optical data can take the form of data points, in a list or table, or may take the form of optical images. SAR data is typically acquired in a ground range format (amplitude or intensity data) or in a side look complex (containing both intensity and phase information). Both formats will separate cross- and co-polarised data into distinct 'bands' or layers. Similarly, imagery from optical sensors are usually organised into bands that correspond to distinct wavelengths (e.g. red, green, near infra-red, etc.). Imagery is provided in a range of digital formats (e.g. geotiff, jpeg2000, band sequential, various binary formats, etc.)

Step 305 involves analyzing, by the water network monitoring system, the obtained set of SAR data and the obtained set of optical data for spatial or temporal anomalies related to a plurality of indirect indicators of leaks in the water network. Analysing step 305 is performed by the analysis module 209 which receives the obtained SAR and optical data from the detector module 207.

The indirect indicators may comprise an indicator of soil moisture or ponding water based on the SAR data. Water has a specific SAR radiation profile, thus its presence can be inferred from the SAR data. In addition, SAR radiation detected from dry soil provides a different profile to SAR radiation detected from wet soil. Thus, the presence of water in the geographical area can be determined, with any anomalies indirectly indicating the presence of leaks in the water network. High resolution SAR data is preferably for detecting surface water.

Increase in water content in the vicinity of a water network leak may lead to an increase in vegetation growth in that area compared to other nearby areas. This can be observed from optical data. Therefore, in some instances the plurality of indirect indicators may comprise an indicator of vegetation growth, indicated based on the obtained optical data. Optical data of medium to high resolution are preferred for detecting this vegetation growth.

The plurality of indirect indicators may comprise an indicator of surface motion or texture change derived from the SAR data. A change in the surface of the geographical area may occur based on water leakage causing soil subsidence or uplift. Therefore, surface motion can be an indicator of a water network leak. Medium to high resolution SAR data is preferred for determining surface motion.

The analyzing is performed using a number of techniques depending on the type of leak that is being investigated, as will be described in more detail below.

Step 307 involves detecting, by the water network monitoring system 100 and based on the analyzing of the obtained set of SAR data and the obtained set of optical data, one or more spatial or temporal anomalies related to at least one of the plurality of indirect indicators of leaks in the water network and not attributable to environmental factors within the geographic region.

Temporal anomalies may be identified by comparing SAR and/or optical data of the same geographical area at a number of points in time to determine usual behaviour. For instance, over a period of time an area may exhibit a water content which changes slowly, but which at a certain point in time may change in an uncharacteristically sudden way. Such a sudden change may be indicative of a water network leak.

Similarly, spatial anomalies may show certain regions of the geographical area displaying an unusual behaviour compared to other regions. For instance, a geographical area may demonstrate a similar water profile across the entire area, except for a small isolated region demonstrating a higher water content. This small isolated region may be indicative of a water network leak if there is no other reason to explain its presence.

In some instances, both spatial and temporal anomalies are analysed in combination. For instance, an unexplained increase in water content may be detected at a certain location not characteristic of its surrounding area, which was not observable at a previous point in time.

Any temporal or spatial anomalies that can be attributed to environmental factors can be ignored. For instance, recent precipitation or flooding events may be responsible for the changes, which do not indicate the presence of a water network leak. Therefore, only the unexplained anomalies are noted, as these may be indicative of a water network leak.

Finally, step 309 involves generating, by the water network monitoring system, a set of graded locations within the geographic region having symptoms associated with leaks in the water network based on the detected one or more spatial or temporal anomalies.

Both steps 307 and 309 are performed by a range of modules within the water network monitoring system 100 including analysis module 209, mapping module 211, overlay module 213, and display module 215, as will be outlined in more detail below.

The method as shown in FIG. 3 will now be described in more specific detail outlining how the water network monitoring system 100 can be used to detect three different types of water network leaks: surface leaks, near-surface leaks, and sub-surface leaks. These different water network leaks present different indicators of their presence depending on factors such as the soil, topography, and climatic conditions.

Water networks, e.g. pipelines, are often at high pressure meaning that any burst can result in water accumulating in the local area rapidly. This pressure may mean that leaks that occur towards the top of pipes may cause surface ponding of water. These types of leaks are referred to here as surface leaks.

Figure 4:
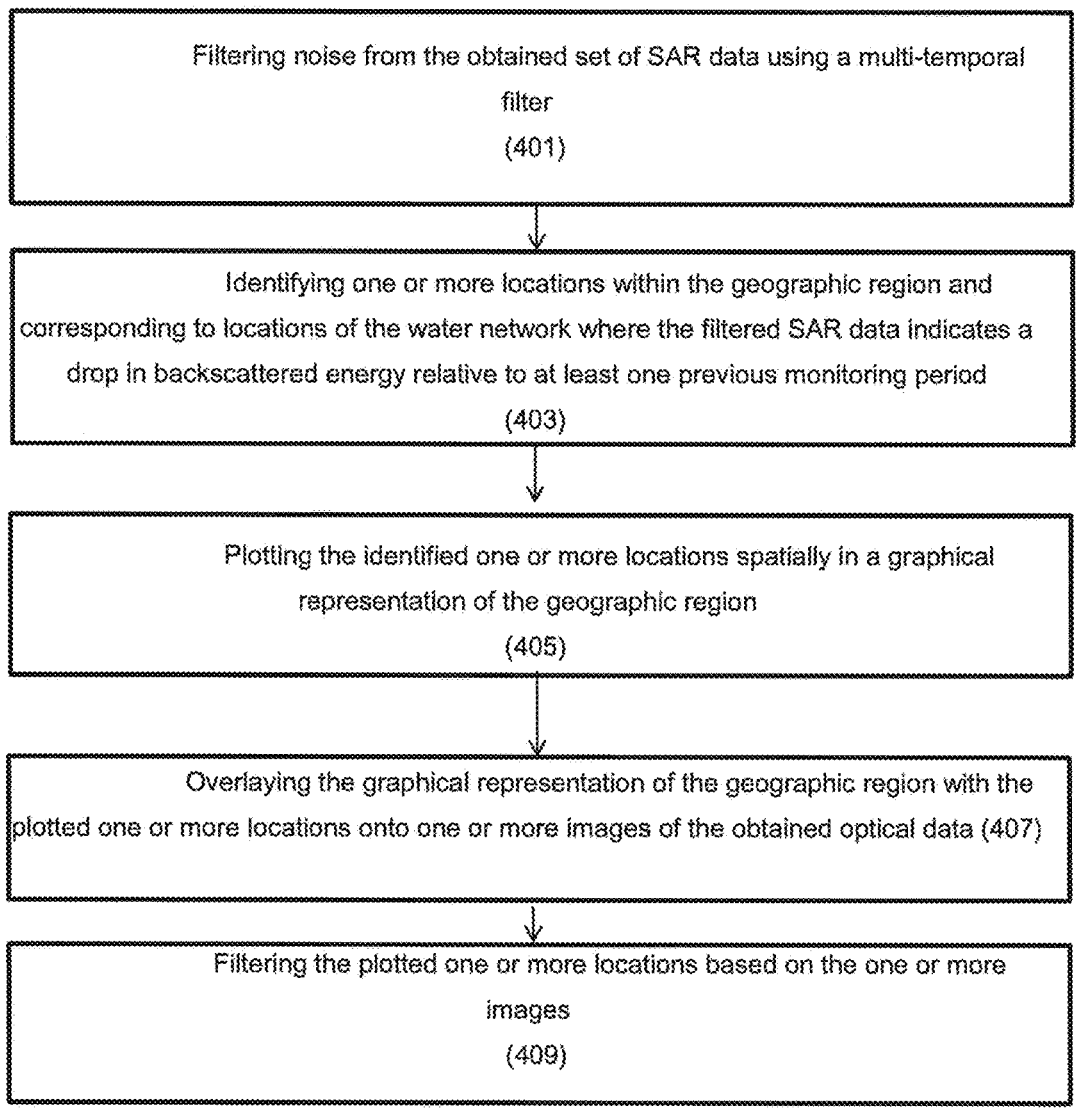
FIG. 4 is a flow chart showing an example method for detecting a surface leak using the water network monitoring system.

FIG. 4 is a flow chart showing a method for detecting a surface leak using the water network monitoring system 100 of FIGS. 1 and 2, describing in more detail how certain steps of the method shown in FIG. 3 can be used to determine surface leaks.

Step 401 involves filtering noise from the obtained set of SAR data from step 301 using a multi-temporal filter. Specifically, analysis module 209 receives from detector module 207 the SAR data, and performs the filtering step. The typical source of noise in SAR data is speckle, or the interference of returned energy from multiple scattering elements in the same pixel. This is an undesirable artefact and it is necessary for it to be removed from the SAR data. The step may involve obtaining multiple SAR data sets over different time periods. The filtering is achieved by averaging out the speckle by comparing the SAR data obtained over the different time periods. The effects that are due to random noise are therefore minimised. Typically the more data sets that can be used the better the filtering. In some instances this may include using at least 15 datasets over a period of at least 6 months. Advantageously, this provides sufficient indication of change over the year to provide useful filtering.

Step 403 involves identifying one or more locations within the geographic region and corresponding these to locations of the water network where the filtered SAR data indicates a drop in backscattered energy relative to at least one previous monitoring period. Multiple SAR data sets are acquired at distinct points in time, in order to determine changes in the backscatter of the SAR data. As mentioned above, different types of surfaces backscatter SAR radiation differently to one another. For instance, moist soil backscatters much more strongly than dry soil. However, once water starts to pond on a ground surface, the backscatter intensity all but disappears. Therefore, this behaviour can provide details on the water content, and as outlined above, unusual changes over successive SAR scans can indicate the presence of a surface leak.

Step 405 involves plotting the identified one or more locations spatially in a graphical representation of the geographic region. This can be carried out by analysis module 209 and mapping module 211 in combination. The plot may involve creating a view of the geographical area with regions exhibiting changes in backscattered radiation clearly indicated. For instance, this may consist of a colour or greyscale index indicating backscatter intensity for regions showing unusual activity. This intensity may be the relative change in backscatter intensity. Alternatively, the plotting may be a graph of backscatter intensity verses time for each identified location.

Overlay module 213 receives from analysis module 209 and the mapping module 211 the graphical representation of the geographical area. It then carries out step 407 which involves overlaying the graphical representation of the geographic region with the plotted one or more locations onto one or more images of the obtained optical data.

At step 409 the overlay module 213 then sends the overlay of the graphical representation to the analysis module 209 which then carries out filtering of the plotted one or more locations based on the one or more optical data to filter false positives. The filtering at step 409 using the optical data enables the number of false positives when identifying the anomalies to be reduced, as the optical data is used as a secondary test in addition to the SAR data. The false positives may be regions where the SAR data indicates anomalous behaviour where there is no indication in the optical band of any leaks. The optical data may be high or medium resolution data.

The optical data may involve a series of near-infrared measurements acquired over a period of time. This data may be acquired at the same points in time, or at different points in time to the collected SAR data.

Reflectance of infrared radiation declines in intensity when ponded water is in abundance on the ground surface. Therefore, the optical data can be used to detect anomalous surface water.

In some instances, instead of, or in addition to, detecting anomalous surface water, the optical data may be used to determine the presence of anomalous vegetation. This vegetation may have unexpectedly appeared between successive optical data being acquired. Alternatively, or in addition, the vegetation may be uncharacteristic of the vegetation in the nearby geographical area.

The use of optical data enables the number of false positives when identifying the anomalies to be reduced, as the optical data is used as a secondary test in addition to the SAR data. The optical data may be high resolution data.

Alternatively, in other instances optical data may not be required and the SAR data may alone provide reliable results without the need to use optical data as an additional test.

Figure 5A:
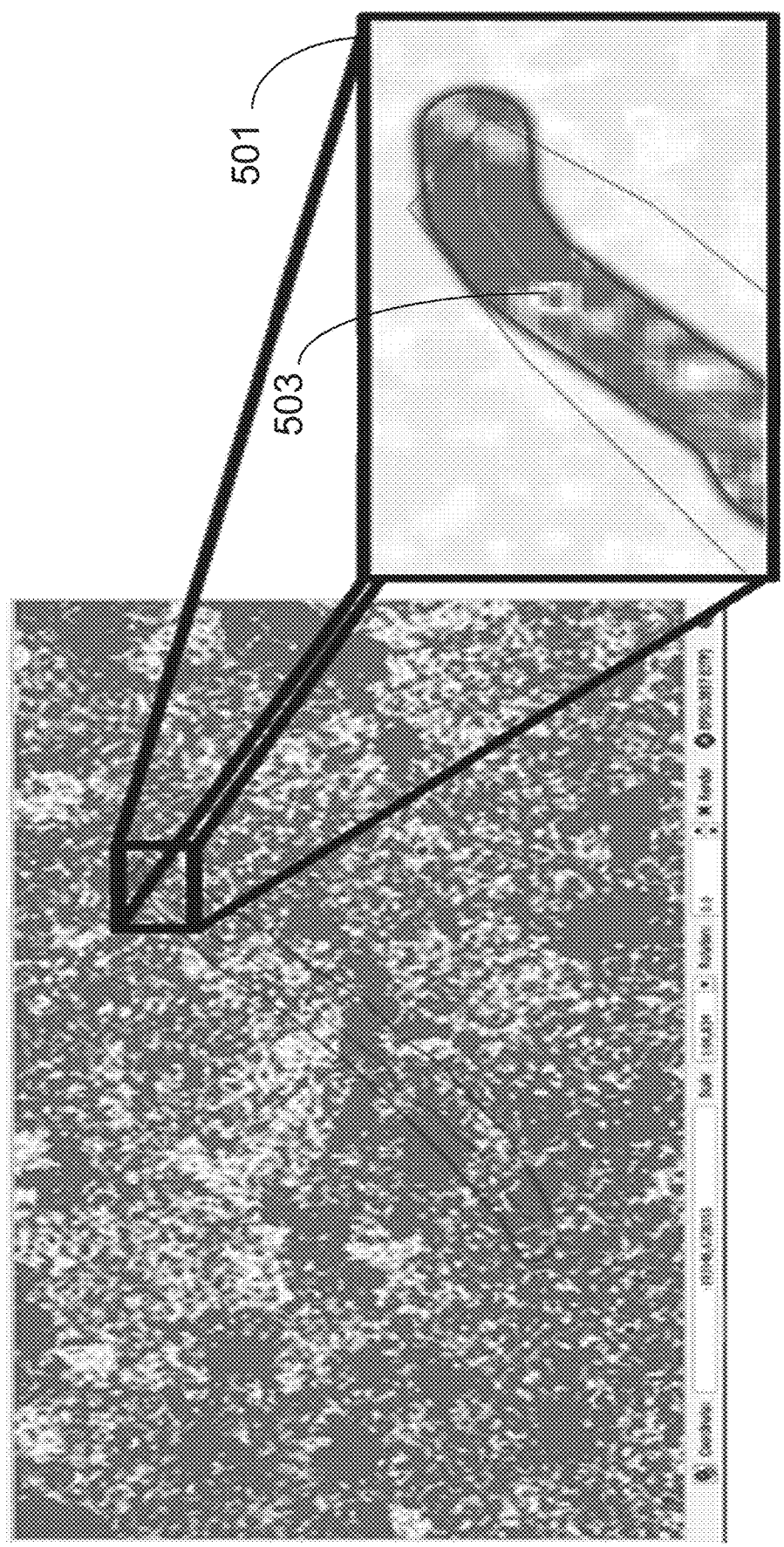
FIG. 5A shows a synthetic aperture radar (SAR) plot of a geographical area in the vicinity of a water network.

The method as described in relation to FIG. 4 can enable surface water leaks to be detected. FIG. 5A shows a SAR plot of the geographical area in the vicinity of a water network obtained from the steps 401 to 403. As can be seen from magnified area 501, location 503 indicates a drop in backscattered energy as can be seen as it has a different signal to the surrounding regions, indicating the presence of a water network leak.

Figure 5B:
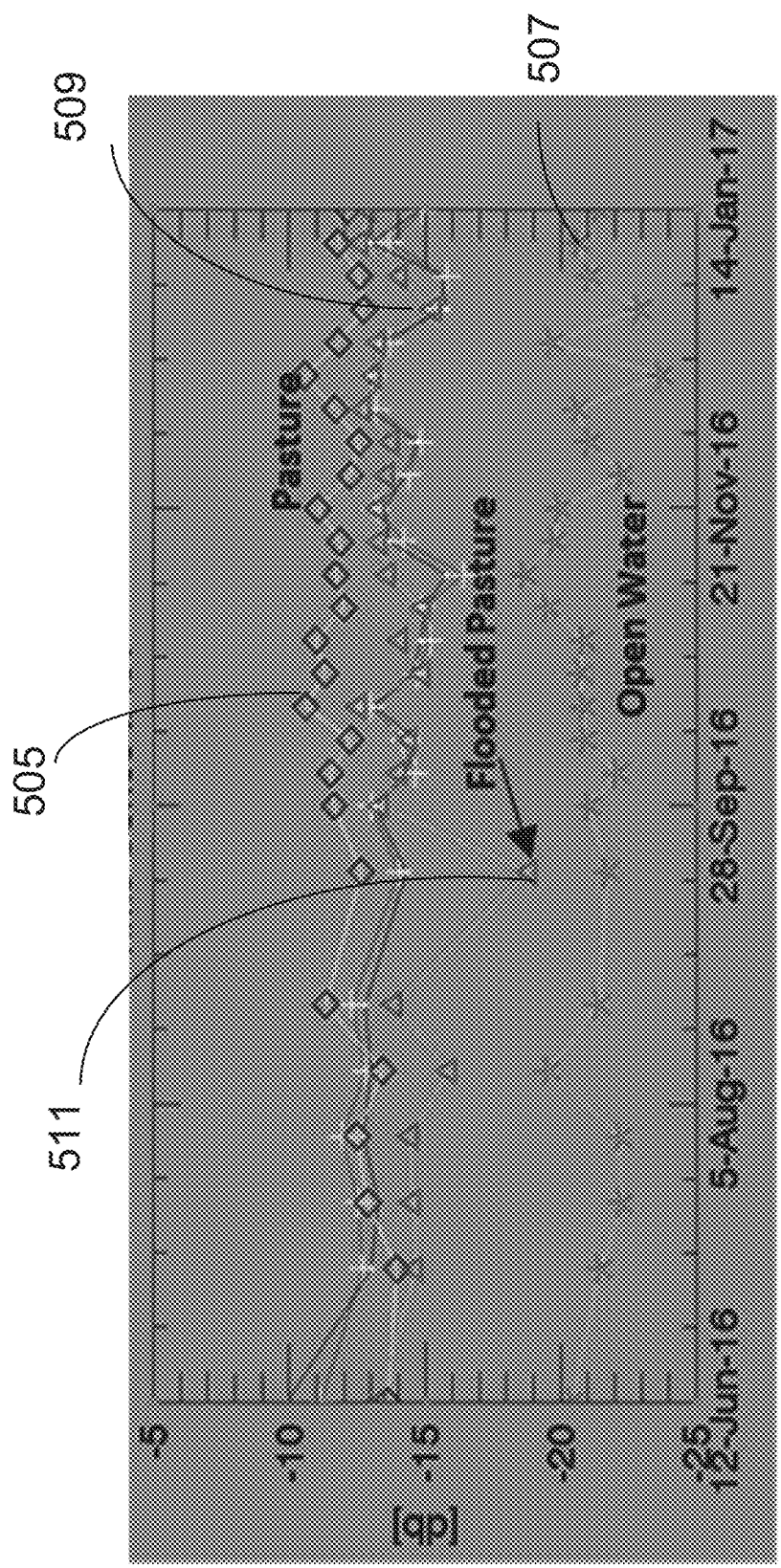
FIG. 5B shows a plot of backscatter intensity against time for different identified area from the SAR plot shown in FIG. 5A.

FIG. 5B shows a graph of backscatter intensity against time for different identified areas of the SAR plot shown in FIG. 5A. The diamond shaped data points 505 correspond to the backscatter behaviour of a typical pasture at ground level, showing an approximately constant intensity throughout. The star shaped data points 507 correspond to the backscatter behaviour of open water. As can be seen the intensity of the backscatter of the open water data points is significantly lower than that of the typical pasture. The triangle shaped data points 509 illustrate another example of a pasture which follows the behaviour of a typical pasture as shown in 505, except for point 511, where the backscatter intensity has significantly decreased. At point 511 the backscatter intensity is closer to that of the open water, indicating the presence of surface water, i.e. the pasture is flooded.

As mentioned above, a similar analysis using optical data may also be carried out to determine any false positives.

The detection of the presence of a flooded pasture may be displayed by display module 215 in the graphical form as shown in FIG. 5B. Alternatively, mapping module 211 may overlay the data onto a graphical representation that may indicate on a map the location of the surface leak. This is then sent to display module 215 such that a map can be displayed, indicating regions displaying abnormal surface water.

FIG. 5C shows a plot obtained using multi-spectra optical data of the geographical area that has been observed over time. As can be seen, area 513 shows an area exhibiting anomalous vegetation growth. As described above, this can be used as a secondary test to determine the presence of a surface leak.

An example method of detecting surface leaks, as carried out by the water network monitoring system 100, is shown in FIG. 6.

At step 601*a* and 601*b* multi-temporal X and C band SAR amplitude data are obtained. These SAR data acquired at different points in time are then precisely co-registered 603 to one another, such that they can be compared. Co-registration is a highly precise process of overlaying the data, such that the same geographical area under observation can be examined over time through the collection of the multi-temporal data.

The co-registered data are then processed by performing a multi-temporal filter 605 and clutter removal algorithms 607, such as clutter minimisation. This may remove unwanted noise, for instance, by destructive interference. The processed data are then examined by performing statistical time series filters 609 to identify locations where backscattered energy drops significantly between SAR data acquired at different points in time.

The SAR data enables a resolution of a certain number of pixels within the geographical area. Thus, the locations can only be distinguished down to the pixel level. For instance, X band data may be acquired at 3 m resolution, and the C band data may be acquired at 15 m resolution. However, it should be understood that other resolutions may be used, as the skilled person would be aware of.

The trend obtained from the statistical time series analysis can be put into a spatial context, by comparing locations where backscattered energy drops significantly to adjacent pixels, to determine if there is an overall change in the area 611 (textual analysis), as shown in FIGS. 5A and 5B. This is useful as a change in only one pixel may be indicative of a false detection, rather than an event due to a water network leakage.

As outlined for FIG. 4, the multi-spectral optical data (i.e. spectra at multiple wavelengths) is obtained 613 in the near-infra-red wavelength. Temporal changes, by comparing a series of optical data acquired at different points in time, are determined by examining for changes in regions where near-infrared energy drops off sharply indicating the presence of surface water at step 615. The SAR and optical data are compared to filter out any false positives at step 617.

Details of the water network is then obtained at input 619 by overlay module 213, and in step 621 overlay analysis performed where the identified locations are overlaid onto the existing water network to help identify the anomalous events that are in the vicinity of the water network. This overlaid data is then sent to the analysis module which determines events that are associated with water network leakage, from other types of unusual activity in areas that are too distant to the water network to be caused by a water network leak.

Rather than being carried out after the steps 603 to 617 have been completed, the overlay of the water network 621 could be carried out initially after acquiring the SAR and/or optical data. This enables the work carried out by the analysis module 209 to be targeted to regions directly around the water network from the outset, rather than identifying anomalies that are not in close proximity to the water network. This increases the efficiency of the analysis.

At step 623 the analysis performed by analysis module 209, overlay module 213, and mapping module 211, is output as the finalised result. The finalised result is sent to display module 215 which displays to the user via GUI 105 the locations of the water network where surface leaks have been detected. This may be in a graphical format, and is preferably as a geographical map as outlined above. Alternatively, the finalised results may be saved as a file, in some cases a text file, the file indicating the locations of the suspected leaks.

The second type of water network leak, near surface leak, occurs typically where water network is located within impervious clay soils, for instance where the leaks originate from the sides or bottom of pipe segments. The clay soils cause the water to spread largely laterally through the soil structure, whilst also increasing the moisture level in the surface soil horizon. Therefore, soil moisture level can be used to detect the presence of these types of leaks.

Figure 7:
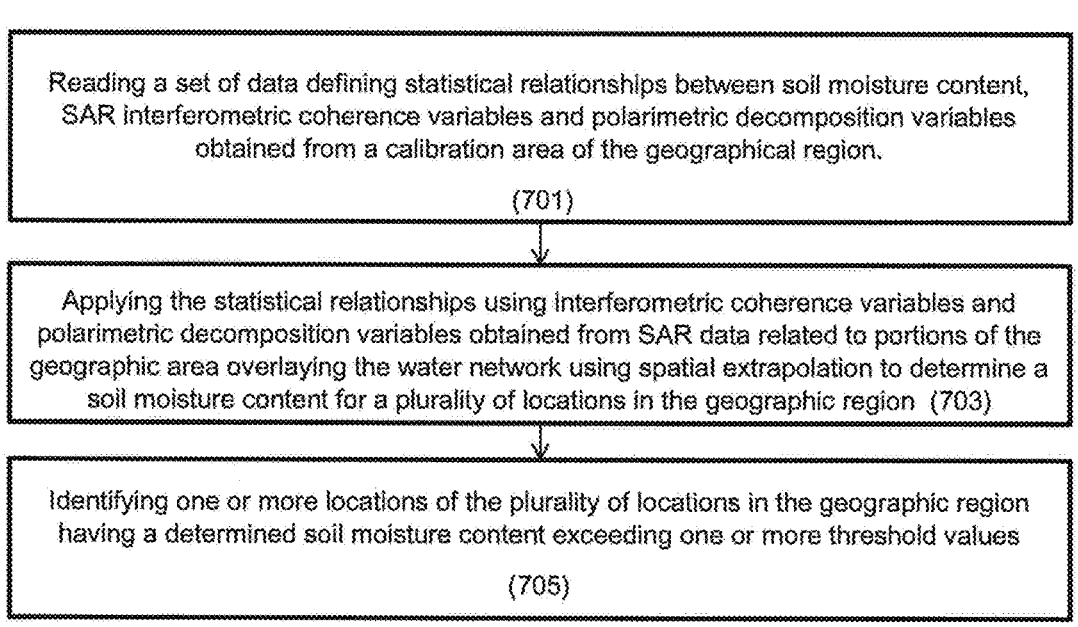
FIG. 7 is a flow chart showing an example method for detecting near-surface leaks using the water network monitoring system.

FIG. 7 shows a method for detecting near-surface leaks using the water network monitoring system 100 of FIGS. 1 and 2, describing in more detail how certain steps of the method shown in FIG. 3 can be used to determine near-surface leaks.

Step 701 involves reading a set of data defining statistical relationships between soil moisture content, SAR interferometric coherence variables and polarimetric decomposition variables obtained from a calibration area of the geographical region.

The statistical relationships may have been determined using a series of SAR data of a calibration area, which is compared to locations within the calibration area with known soil moisture levels. For instance, the known soil moisture levels may have been measured using ground based soil moisture sensors. A statistical relationship is thus created from comparing the SAR data at these points to the soil moisture level detected by the sensor network at these points.

The statistical relationships may be determined based on using any combination of interferometric coherence variables, and polarimetric decomposition variables obtained from SAR data.

Step 703 involves applying the statistical relationships using interferometric coherence variables and polarimetric decomposition variables obtained from SAR data related to portions of the geographic area overlaying the water network using spatial extrapolation to determine a soil moisture content for a plurality of locations in the geographic region.

The SAR data may be the SAR data obtained in step 301 of FIG. 3. In some instances, SAR data may be acquired over time, and compared to one another to determine changes in the soil moisture content.

Based on the statistical relationships the soil moisture content for a plurality of locations can be determined. Detection of the soil moisture content is not limited to regions of the water network that are near to the ground soil moisture sensors (i.e. the calibration area), as the results can be extrapolated to determine from the SAR data the soil moisture at each point of the geographical area.

This has the advantage of reducing the number of physical ground sensors required, decreasing time spent on installation, upkeep and maintenance, whilst enabling the surface moisture to be determined in regions that are not easily accessible on foot.

Step 705 involves identifying one or more locations of the plurality of locations in the geographic region having a determined soil moisture content exceeding one or more threshold values. The threshold may be set depending on the typical or atypical behaviour expected in that location. The topography of the area may be taken into consideration in determining typical soil moisture content. For instance, the soil type may directly affect the soil moisture content, with clay soils typically having high moisture content and sandy soils typically having low surface moisture. In addition, factors such as recent precipitation events, or known flooding events, may be taken into account when determining the threshold.

The method as described in relation to FIGS. 7 and 8 can enable near-surface water leaks to be detected. FIGS. 9A to 9B illustrate graphically certain steps of the near-surface water estimation.

Figure 8A:
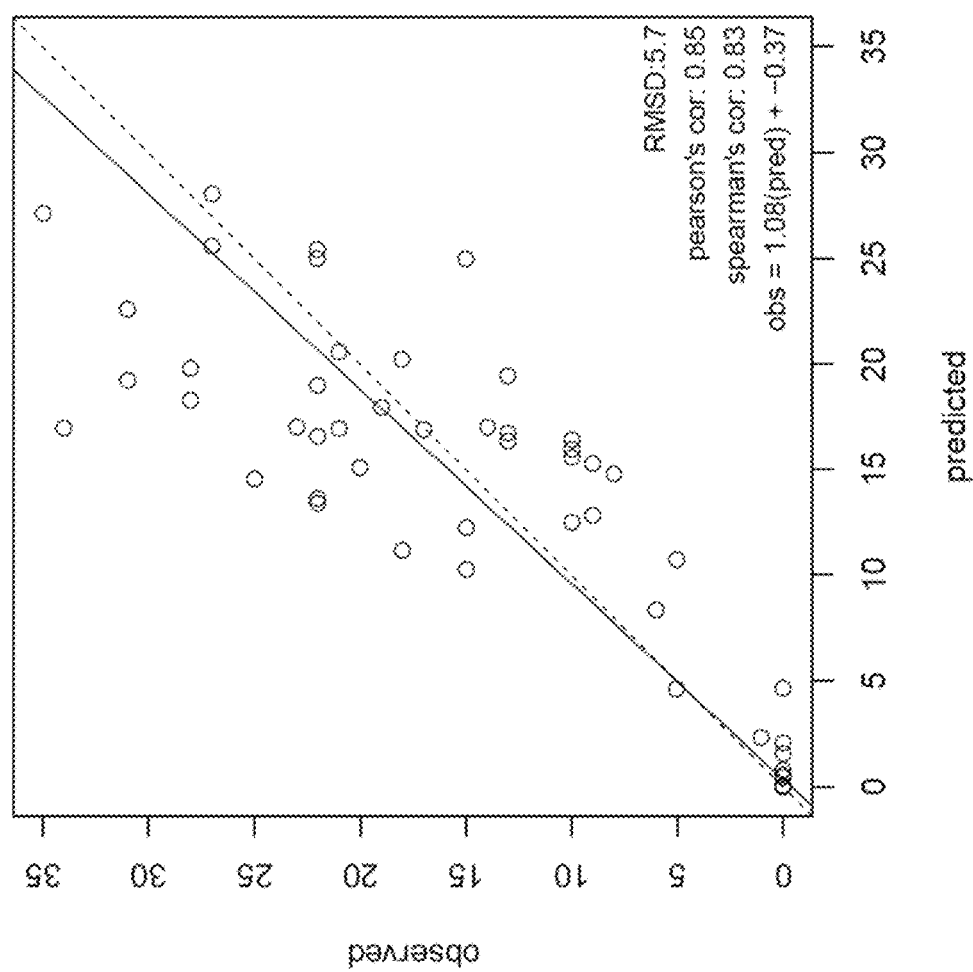
FIG. 8A shows a graph of predicted against observed values of soil moisture level of the geographical area of interest obtained by the water network monitoring system.

FIG. 8A shows a graph of predicted against observed values of soil moisture level, based on the statistical relationship between soil moisture content and SAR data. The graph has been obtained from a series of SAR data obtained over time, having been compared to the actual soil moisture level obtained by ground sensors.

Figure 8B:
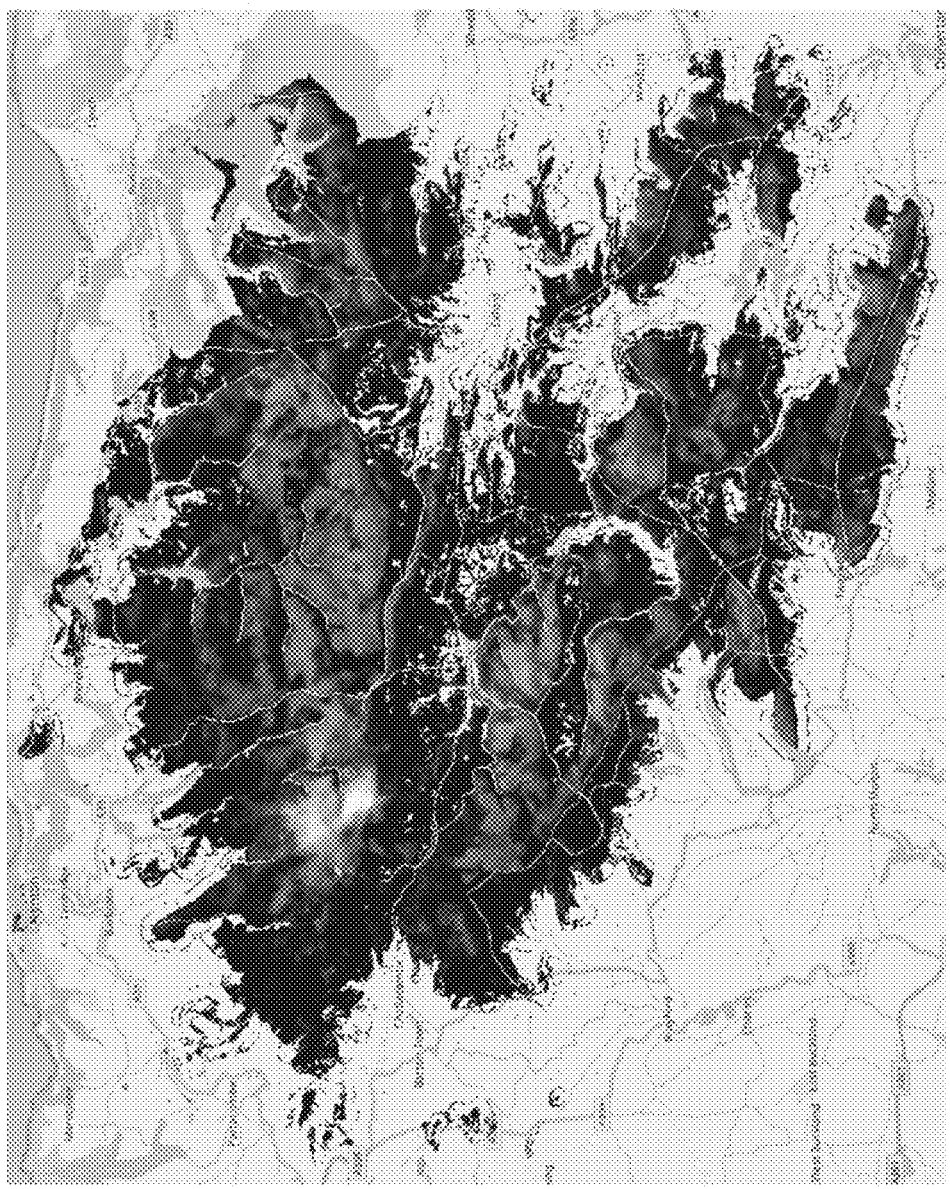
FIG. 8B shows a plot of the geographical area under observation illustrating soil moisture content determined by water network monitoring system.

FIG. 8B shows a plot of the geographical area under observation illustrating soil moisture content. FIG. 8B shows how, based on extrapolating the statistical model to regions of the water network, the moisture content can be determined, to identify regions with anomalous soil moisture content exceeding threshold values, as explained above.

Figure 9:
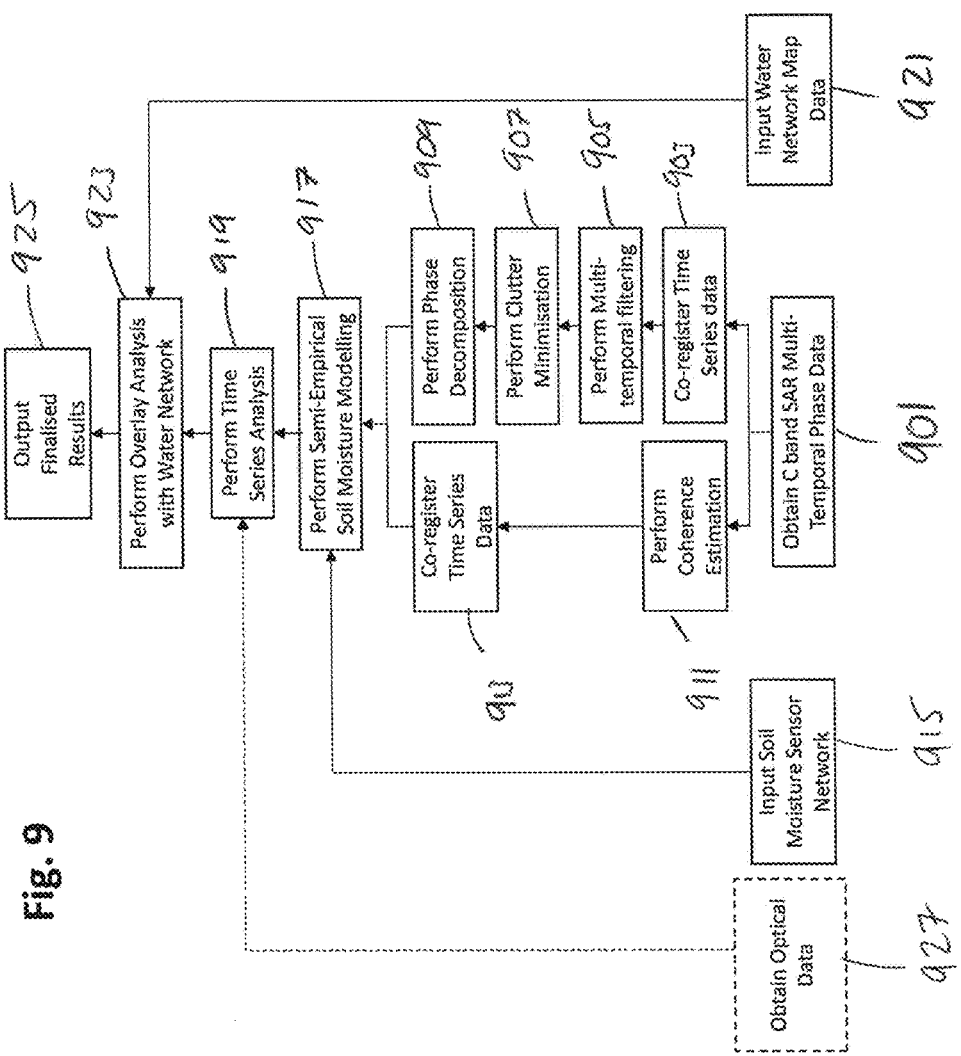
FIG. 9 is a flow chart showing an example method for detecting near-surface leaks using the water network monitoring system.

An example of the near-surface leak detection carried out by the water network monitoring system 100 is shown in FIG. 9.

Dual polarisation multi-temporal C band SAR phase data is obtained 901 by detector module 207. This is then sent to analysis module 209 for co-registration of the time series data 903, and performing multi-temporal filtering 905. Clutter minimisation 907 is then performed to remove contributions from unwanted noise, as previously discussed. Polarimetric phase decomposition is then performed 909 to measure the polarisation of the SAR data.

Meanwhile coherence estimation is performed 911 by analysis module 209, and this time series SAR data co-registered 913. The coherence estimation measures the similarity (and/or differences) of the phase aspect of the radar data acquired at multiple points in time. The interferometric coherence and polarimetric decomposition variables are combined with soil moisture data received at input 915 from ground based soil moisture sensor network, to develop a statistical relationship between surface soil moisture and the filtered calibrated dual polarisation C band SAR phase data in step 917, to create the empirical soil moisture model (i.e. statistical relationship).

At specifically defined time intervals further SAR data are acquired by detector module 207 with statistical time series analysis of the SAR data at each interval performed 919 by analysis module 209, wherein the SAR data acquired for the time series analysis is processed using the same steps as used to create the statistical model. The SAR data is compared to the statistical relationship to determine soil moisture content at regions of the water network, as shown in FIG. 8A. The SAR data may also in some instances be used to further refine the statistical model, with soil moisture sensors detecting soil moisture content at each of the time intervals. In other situations, once the statistical model has been created there may be no further need to have soil moisture sensors.

In either case, the statistical relationship can be extrapolated by analysis module 209 to portions of the SAR image in the vicinity of the water network 921 to determine the soil moisture content. The water network received as input of the water network map 921 may be overlaid by overlay module 213 onto the output of the time series analysis 923 to determine regions where the determined soil moisture content exceeds a certain threshold. This can then be sent to display module 215 to display the abnormal soil moisture content to the user, thus indicating a suspected water network leak. This may be indicated to the user in any way that the skilled person would understand. For instance, a graphical form is preferred as shown in FIG. 8B. However, it can be envisaged that any other way of indicating a location can be used, for instance, coordinates of the location could be used. Or any other method of presenting results as discussed herein.

As shown in FIG. 9 the use of optical data at input 927, as implemented in the method shown in FIG. 3, may also be used. This may be in the same manner as described above for surface leak detection, to eliminate the detection of false positives. However, it should be understood that the use of optical data for near-surface leak detection is entirely optional.

The third types of leak that may be detected are sub-surface leaks. Sub-surface leaks typically occur from leaks in the sides and bottoms of pipe segments. As a result of these leaks, the water percolates down into the deeper soil layers, which can result in localised surface soil subsidence or upheaval.

Figure 10:
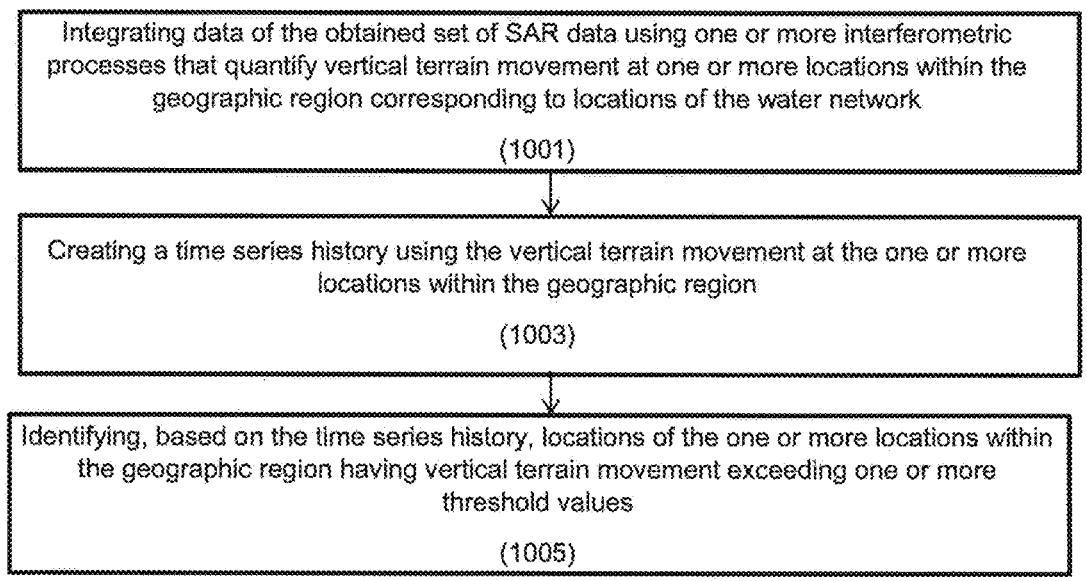
FIG. 10 is a flow chart showing an example method for detecting sub-surface leaks using the water network monitoring system.

FIG. 10 shows a method for detecting sub-surface leaks using the water network monitoring system 100 of FIGS. 1 and 2, describing in more detail how certain steps of the method shown in FIG. 3 can be used to determine sub-surface leaks.

Step 1001 involves integrating data of the obtained set of SAR data using one or more interferometric processes that quantify vertical terrain movement at one or more locations within the geographic region corresponding to locations of the water network (1001). Interferometric processes involve comparing a plurality of SAR measurements to estimate terrain movement. The interferometric processes may involve obtaining a pair of SAR datasets of same frequency band from the geographical area and comparing the phase difference between the pair of SAR datasets.

Step 1003 involves creating a time series history using the vertical terrain movement at the one or more locations within the geographic region. By acquiring a series of SAR datasets at different times, changes in the vertical terrain motion can be monitored.

Step 1005 involves identifying, based on the time series history, locations of the one or more locations within the geographic region having vertical terrain movement exceeding one or more threshold values.

The threshold values may be determined based on the threshold set according to typical or atypical terrain motion behaviour expected in that location. When determining a threshold value the topography of the area may be taken into consideration as this is likely to have an effect on the terrain motion. For instance, soil type may directly affect the terrain motion. In addition, man-made influences may need to be taken into account, such as nearby mining activity. By detecting abnormal vertical terrain motion exceeding a threshold, the presence of water network leakage can be inferred.

The method as described in relation to FIGS. 10 and 11 can enable sub-surface water leaks to be detected. FIGS. 11A to 11D illustrate graphically certain steps of the sub-surface leak detection.

Figure 11A:
FIG. 11A shows the raw SAR backscatter data for the geographical region that is being observed by the water network monitoring system.

FIG. 11A shows the raw SAR backscatter data for a geographical region that is being observed by the water network monitoring system 100. As can be seen in FIG. 11A the SAR plot shows intensities indicating areas exhibiting different backscatter behaviour.

Figure 11B:
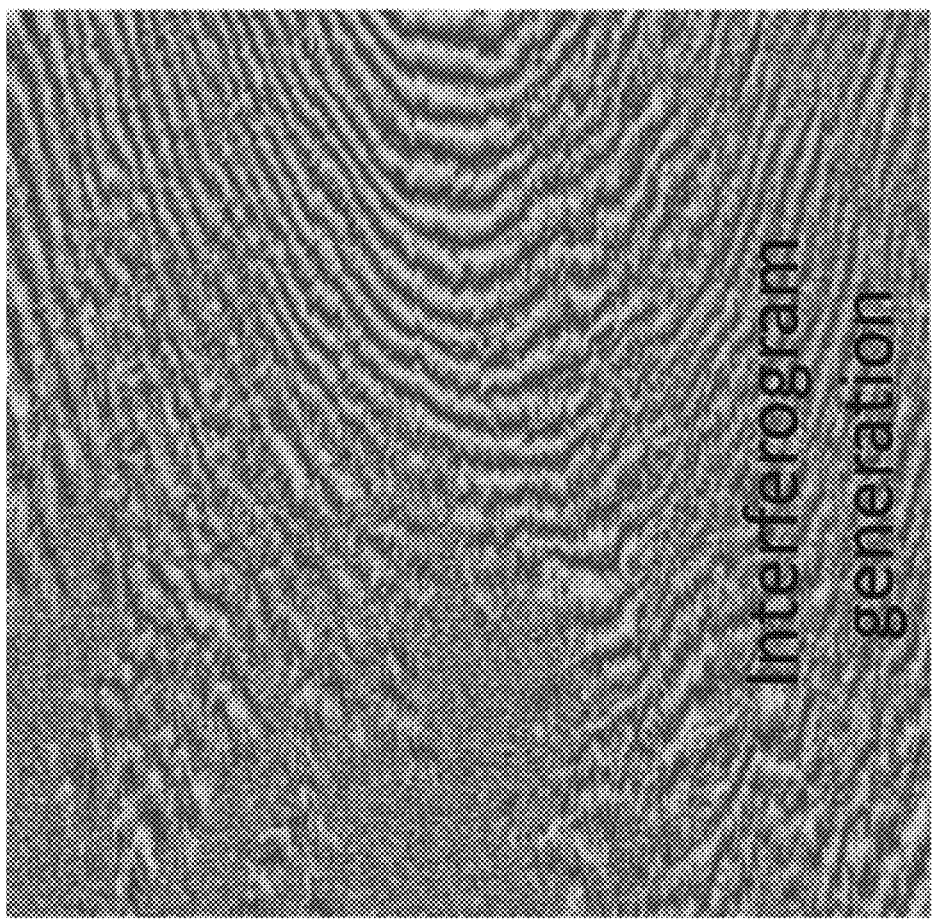
FIG. 11B shows the integrated SAR data showing the generated interferogram of the geographical region that is being observed by the water network monitoring system.

FIG. 11B shows an example interferogram generated from consecutive SAR images of the geographical region observed by the water network monitoring system.

Figure 11C:
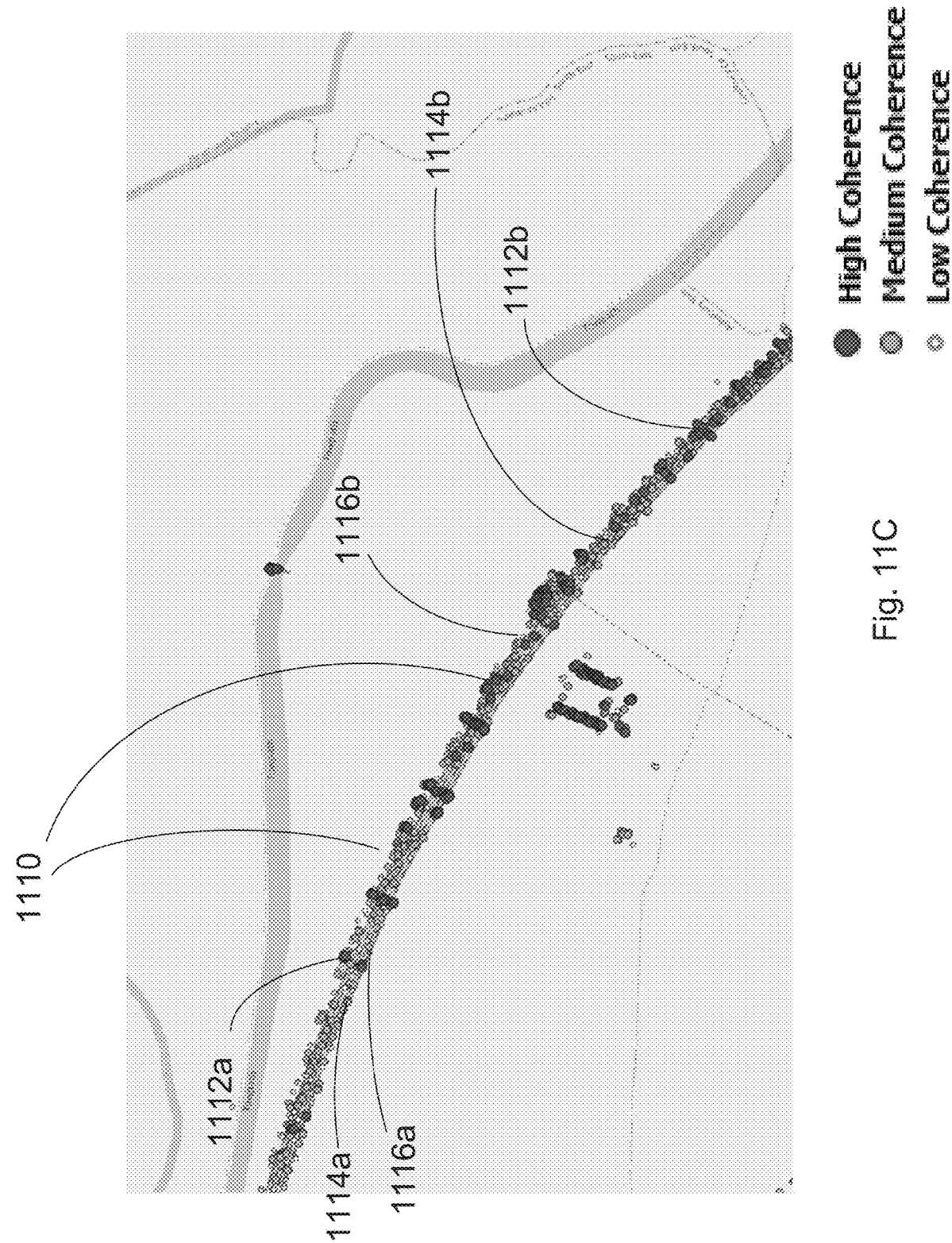
FIG. 11C illustrates, based on the interferogram of FIG. 11B, the geographical area showing preliminary persistent scatterers and their estimated coherence.

FIG. 11C shows based on the interferogram of FIG. 11B, the geographical area showing areas of consistent scattering, i.e. preliminary persistent scatterers. The water network is shown in shaded at reference 1110. The shade coded dots indicate the estimated coherence of the preliminary persistent scatterers. Areas that show high coherence, above a certain threshold, are shown as indicated by darker spots, such as 1112a and 1112b. Areas that show medium coherence are indicated by slightly lighter spots are indicated by 1114a and 1114b, with the even lighter shaded spots indicating areas with low coherence 1116a and 1116b. The areas of high coherence can be identified as reliable targets to estimate terrain motion, during the time series analysis.

Figure 11D:
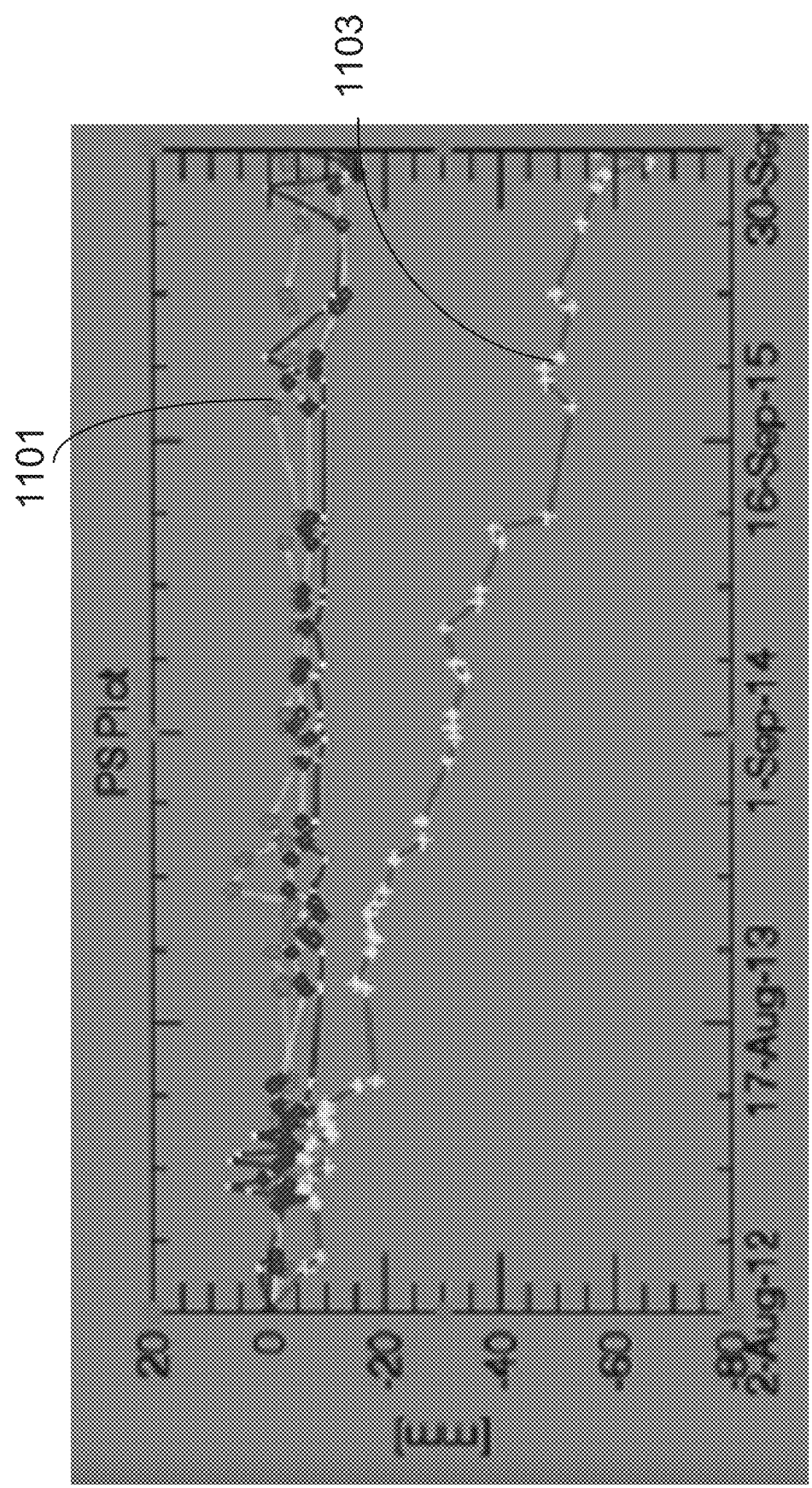
FIG. 11D shows a plot of vertical height of terrain at a number of points in time, for a number of locations in the geographical area, as measured by the water network monitoring system.

FIG. 11D shows a plot of vertical height (in mm) for a number of locations in the geographical area, with each data point representing data obtained from the SAR measurements acquired at time intervals between 22 Aug. 2012 and 30 Sep. 2016. The vertical height is normalised with respect to the initial measurement at 22 Aug. 2012. Thus any change in vertical height can be easily viewed from the graph. Data sets 1101 show negligible vertical motion over the time period. However, the data set 1103 shows a decrease in the vertical height over this time period of approximately 60 mm. Any unusual trend in vertical terrain motion may be indicative of the presence of a sub-surface leak. The amount of vertical terrain motion may depend on many factors, including leak rate, the duration of the leak event, and soil type.

Figure 12:
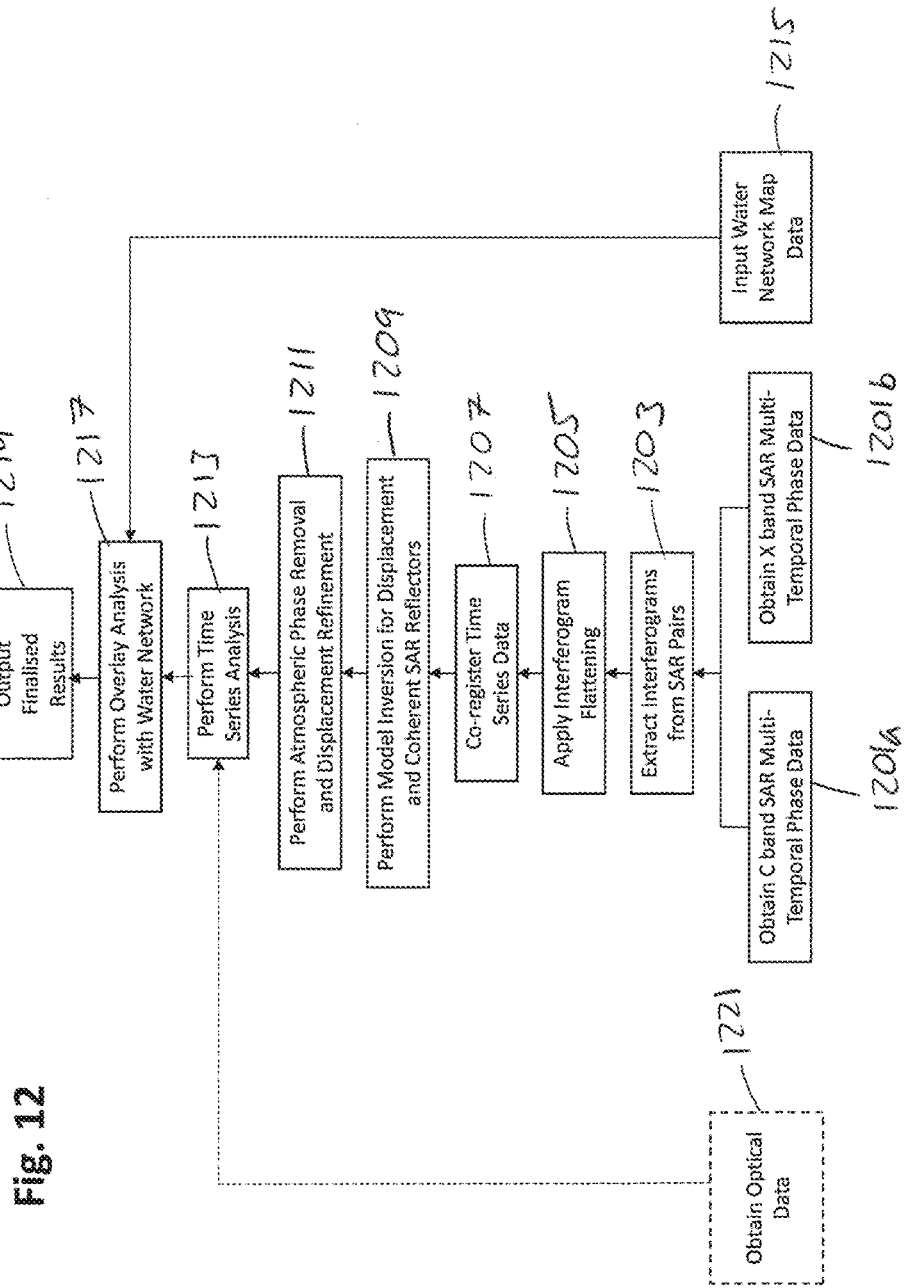
FIG. 12 is a flow chart showing an example method for detecting sub-surface leaks using the water network monitoring system.

An example of the sub-surface leak detection carried out by the water network monitoring system 100 is shown in FIG. 12.

C and X band SAR multi-temporal phase images 1201a 1201b are obtained by detector module 207 and forwarded to analysis module 209. For instance, as shown in FIG. 11A. Each of the C and X band SAR measurements are compared to a C or X band SAR measurement acquired at a slightly later point in time 1203. This allows analysis module 209 to extract an interferogram (as shown in FIG. 11B), by comparing the phase shift within each pair.

The analysis module 209 then applies interferogram flattening to remove the unwanted phase change contribution due to the curvature of the earth. The time series data is then co-registered 1207. The interferogram is then inverted to locate robust natural coherent SAR reflectors, also known as persistent scatterers 1209. These persistent scatters may indicate vertical terrain motion for the particular location, as can be seen in FIG. 11C as discussed above.

The analysis module 209 then corrects for the contributions due to the Earth's atmosphere which may have an effect by changing the phase of the SAR data, and any final refinement of the displacement observed can be carried out 1211.

Steps 1201 to 1211 are then repeated at various points in time to obtain details of the history of vertical terrain motion as shown in FIG. 11D. Statistical time series analysis 1213 is then performed to identify locations that exhibit vertical terrain motion that unexpectedly changes over time. This can be determined by comparison to a threshold value which is used to indicate abnormal vertical terrain movement. This data is then sent by analysis module 209 to overlay module 213, which performs overlay analysis by comparison with the input water network map data by overlaying the data indicating abnormal vertical terrain motion, onto the water network 215. This means that only locations in the vicinity of the water network are presented to the user.

At step 1219 the finalised results can be output, with locations in the vicinity of the water network which exhibit vertical terrain movement exceeding the threshold value sent to display module 215, which through GUI 105 displays these results. This display may be in the form of a graph, or as a map indicating the locations where this abnormal terrain movement is present as has been discussed herein for the other detection methods. This can indicate to the user the areas where there may be potential sub-surface leakage.

When determining terrain motion via interferometry, as described above, relative changes are measured and thus the actual elevation of the geographical area under observation is not required to measure the terrain motion. The interferogram indicates the amounts of interference generated between two SAR scenes. The interference patterns are then "unwrapped" to estimate the contributions of topography, atmosphere, etc. that contribute to the interference. Once these contributions are estimated, they can be removed until all that is left is the interference that comes from terrain motion.

As shown in FIG. 12 the use of optical data 1221, as implemented in the method shown in FIG. 3, may also be used. This may be in the same manner as described above for surface leak detection, to eliminate the detection of false positives. However, it should be understood that the use of optical data for sub-surface leak detection is entirely optional.

In addition to detecting water network leakage events, the water network monitoring system 100 using the Earth observation data techniques disclosed herein, may also be used to detect the likelihood of a water network leakage occurring.

One of the principal causes of water network leakage is vegetation intrusion, where roots from plants or trees physically impact on the water network, causing damage and ultimately a leak.

Movement of the terrain in which the water network is located can also be a cause of water network leakage. For instance, if the water network is a pipe network the pipe may be put under pressure and strain causing physical damage to the pipe.

As vegetation intrusion and the water network itself are below ground level, and since terrain movement is not easily observed by eye, the use of Earth observation data techniques by the water network monitoring system 100 can provide a wealth of information that can be used to assess the risk of a water network leak occurring.

The present system determines these risks by analysing terrain motion and vegetation intrusion, with known attributes of the water network to develop a risk index. The attributes may comprise any of the age of the water network, the depth at which the water network is located, and/or the construction material of the water network. Thus, it is possible to calculate the risk index to identify water network infrastructure that might experience elevated frequency of leak events.

This enables the water utilities companies to act before a water network leak occurs, allowing them to save resources as it is easier to repair a water network before a leak has fully developed. This also reduces the need to cut off the flow to the water network, which would be required when a full leak occurs to prevent water loss. Homes are therefore less likely to go without water for extended periods, which may be particularly problematic in rural locations.

Figure 13:
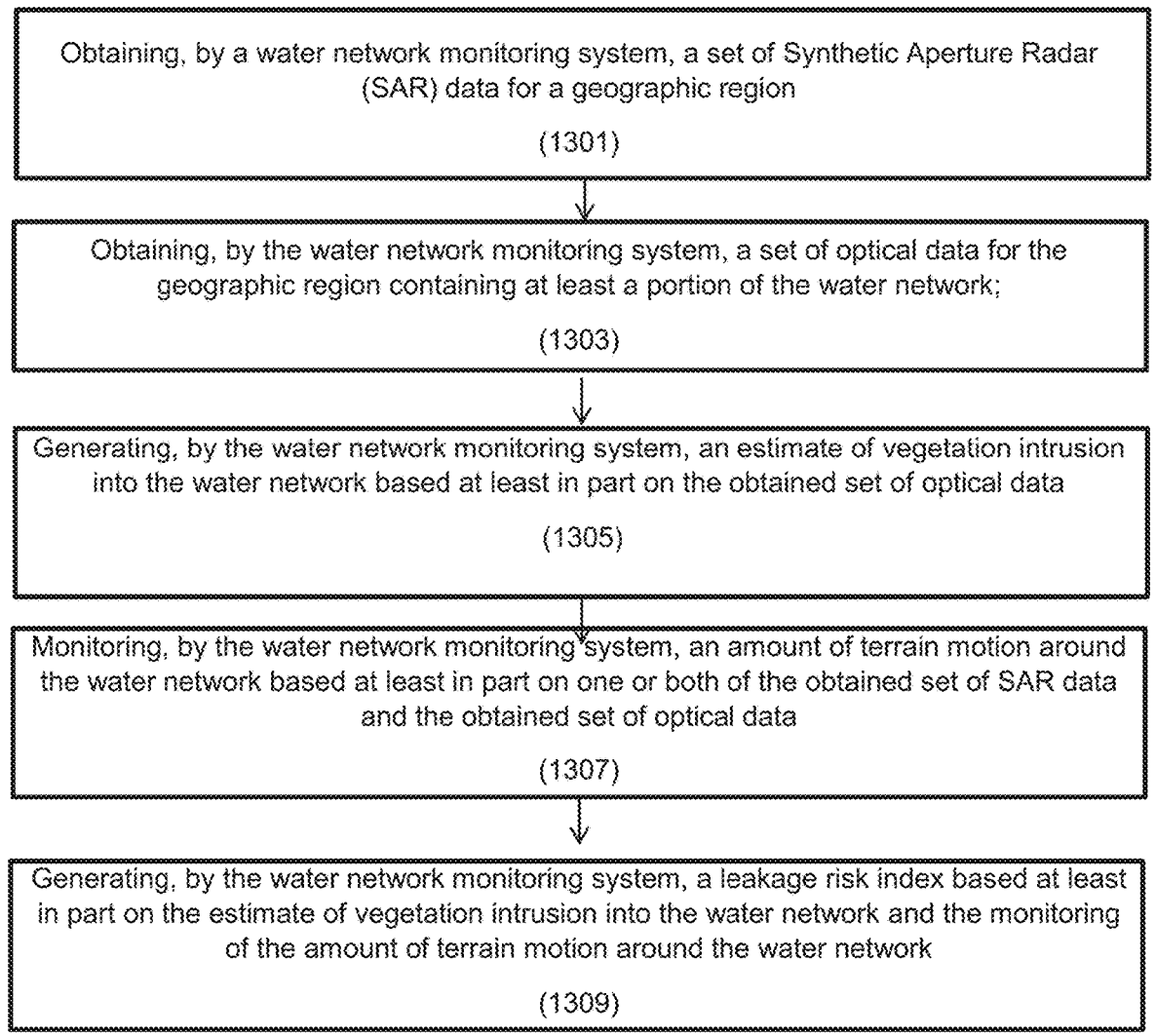
FIG. 13 is a flow chart showing an example method for monitoring a water network to determine a risk index using the water network monitoring system.

The flow chart of FIG. 13 illustrates a method for monitoring a water network to determine a risk index as performed by the water network monitoring system 100 of FIGS. 1 and 2.

Step 1301 involves obtaining, by the water network monitoring system 100, a set of synthetic aperture radar (SAR) data for a geographic region. Step 1303 involves obtaining, by the water network monitoring system 100, a set of optical data of the geographic region containing at least a portion of the water network. Both steps 1301 and 1303 are analogous to steps 301 and 303 as discussed above in relation to FIG. 3.

Step 1305 involves generating, by the water network monitoring system 100, an estimate of vegetation intrusion into the water network based at least in part on the obtained set of optical data. Step 1305, is carried out by the analysis module 209, upon receiving the optical data from the detector module 207. Details of step 1305 will be discussed in more detail below.

Step 1307 involves monitoring, by the water network monitoring system, an amount of terrain motion around the water network based at least in part on one or both of the obtained set of SAR data and the obtained set of optical data. Details of step 1307 will be discussed in more detail below.

Step 1309 involves generating, by the water network monitoring system, a leakage risk index based at least in part on the estimate of vegetation intrusion into the water network and the monitoring of the amount of terrain motion around the water network.

As outlined above, vegetation intrusion and terrain motion are the main environmental causes of water network leakage. Therefore, steps 1305 and 1307 enable the water network monitoring system 100 to obtain these useful indicators, which in step 1309 are used to generate a leakage risk index indicating the likelihood of water network leakage.

Generating, the leakage risk index may involve the analysis module 209 reading a set of data defining one or more threshold values for each of the generated estimate of vegetation intrusion into the water network and the amount of terrain motion around the water network. The analysis module 209 may then assign a risk category to one or more locations along the water network based on a value for the generated estimate of vegetation intrusion into the water network or a value for the amount of terrain motion around the water network exceeding one or more of the threshold values.

The method of FIG. 13 may further comprise obtaining a set of data defining one or more physical attributes of the water network at one or more locations in the geographic region. Analysis module 209 may obtain these physical attributes from external database 217. The physical attributes may comprise any of any of age, depth, construction material, of the water network. In step 1309 the leakage risk index may be generated based on the physical attributes of the water network. This may be in addition to the vegetation intrusion and terrain motion.

Figure 14:
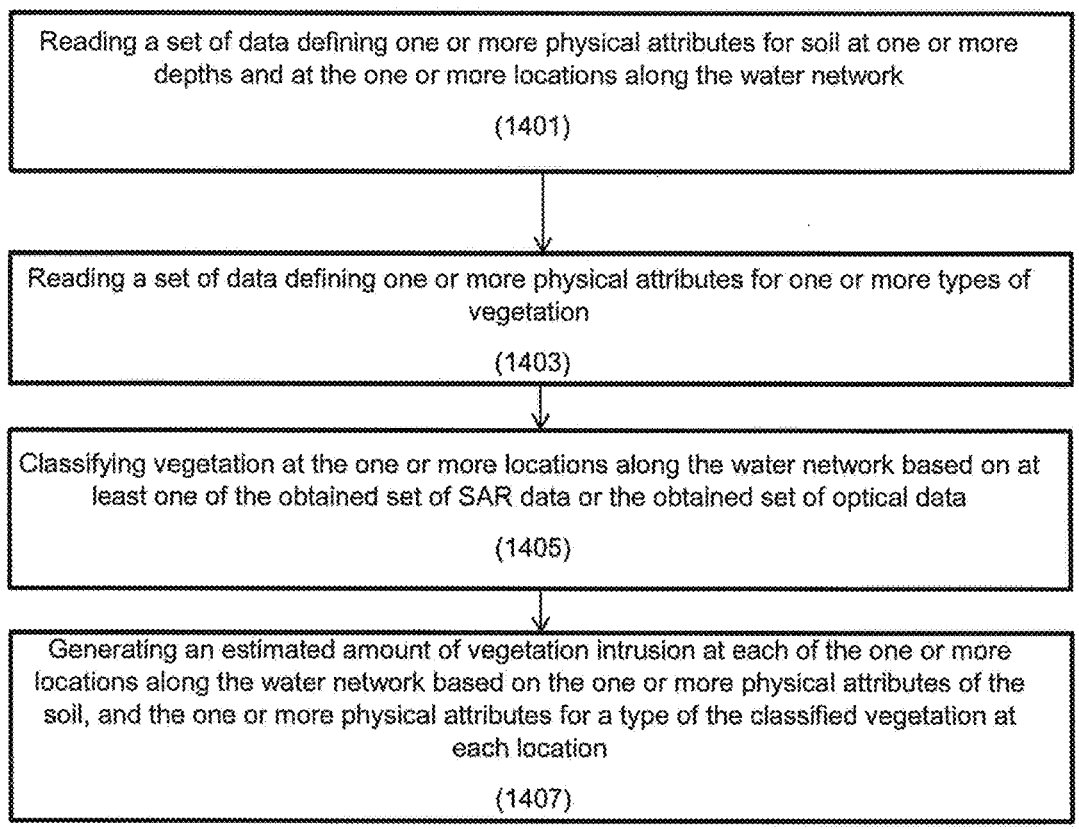
FIG. 14 is a flow chart showing an example method for estimate of vegetation intrusion using the water network monitoring system.

The estimate of vegetation intrusion obtained by the water network monitoring system in step 1305 is now discussed in more detail in relation to FIG. 14.

FIG. 14 is a flow chart showing a method for estimate of vegetation intrusion using the water network monitoring system 100.

Step 1401 involves reading a set of data defining one or more physical attributes for soil at one or more depths and at the one or more locations along the water network. The data defining the physical attributes for soil may be obtained by analysis module 209 from external database 217. The physical attributes may comprise details on the soil texture at various depths. In other instances the physical attributes may comprise details on the soil type at various depths. For instance, this may be whether the soil is sandy or clay based. Having details on the soil at various depths can provide details on the likelihood that the vegetation in the vicinity of the water network will intrude on the water network causing leakage. For instance, soil texture and the presence of restrictive soil layers (e.g. hardened pans) may limit rooting depth.

Step 1403 involves reading a set of data defining one or more physical attributes for one or more types of vegetation. This data defining one or more physical attributes may be obtained by analysis module 209 from external database 217. The physical attributes for the vegetation may involve typical rooting attributes for different vegetation. For instance, this may involve details on typically how far roots of a particular type of vegetation extend, or typical depths to which the roots may grow. These factors are important when determining the likelihood that vegetation is a risk for the water network.

Step 1405 involves classifying vegetation at the one or more locations along the water network based on at least one of the obtained set of SAR data or the obtained set of optical data. Different types of vegetation can be readily identified by exhibiting different backscatter profiles within the SAR data. Vegetation types can also be readily seen from optical data. Therefore, by acquiring the SAR and optical data the type of vegetation in the vicinity of a water network can be determined.

Thus, step 1407 involves generating an estimated amount of vegetation intrusion at each of the one or more locations along the water network based on the one or more physical attributes of the soil, and the one or more physical attributes for a type of the classified vegetation at each location.

The combination of the physical attributes of the soil and the physical attributes for the type of the classified vegetation at each location, are all factors that may contribute to vegetation intrusion that can cause a water network leak. Analysis module 209 after having received all of the physical attributes can carry out step 1407 to estimate this vegetation intrusion.

For instance, an aging water network, which is in close proximity to lots of vegetation of a certain type that is known to have roots that extend to the depth of the water network, may indicate vegetation intrusion. Whereas, regions where there is vegetation with shallow roots that do not extend to the depth of the water network may indicate minimal, to no, vegetation intrusion.

Figure 15:
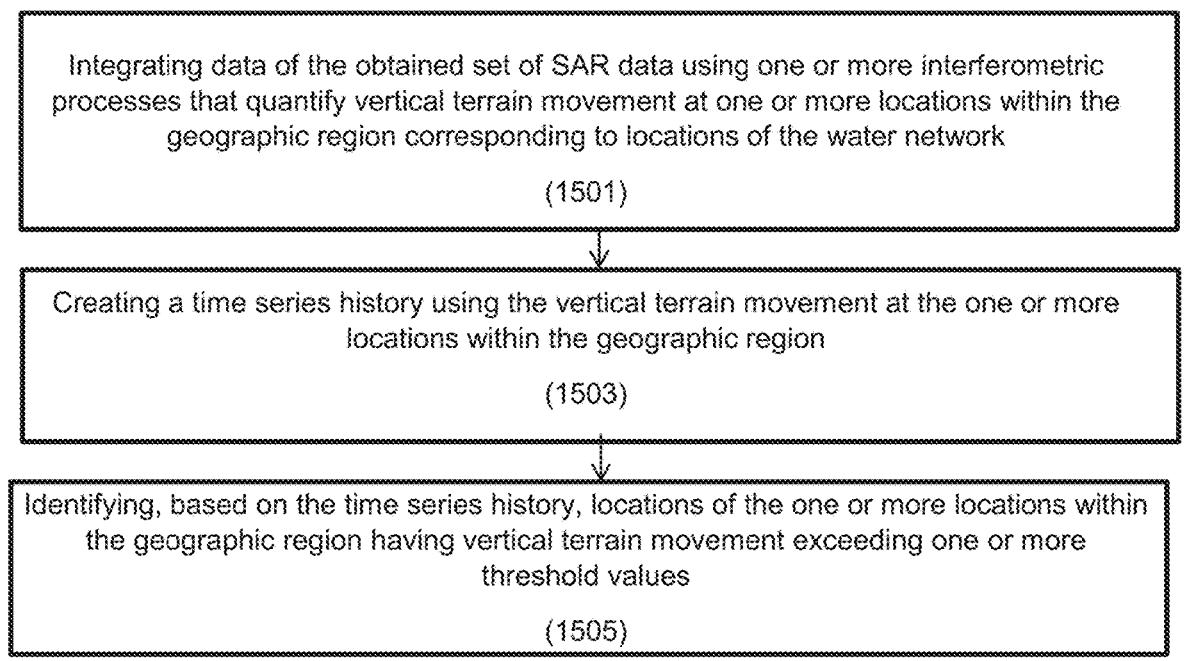
FIG. 15 is a flow chart showing an example method for determining terrain motion using the water network monitoring system.

FIG. 15 describes step 1307 of FIG. 13 in more detail, setting out how the water network monitoring system 100 monitors the terrain motion around the water network.

Step 1501 involves integrating data of the obtained set of SAR data using one or more interferometric processes that quantify vertical terrain movement at one or more locations within the geographic region corresponding to locations of the water network. Interferometric processes involve comparing a plurality of SAR measurements to estimate terrain movement. The interferometric processes may involve obtaining a pair of SAR datasets of the same frequency band from the geographical area and comparing the phase difference between the pair of SAR datasets.

Step 1503 involves creating a time series history using the vertical terrain movement at the one or more locations within the geographic region. By acquiring a series of SAR datasets at different times, changes in the vertical terrain motion can be monitored.

Step 1505 involves identifying, based on the time series history, locations of the one or more locations within the geographic region having vertical terrain movement exceeding one or more threshold values.

As discussed for sub-surface leak detection above, the threshold values may be determined based on the threshold set according to typical or atypical terrain motion behaviour expected in that location.

The method of measuring terrain motion as shown in FIG. 15 may involve using a dense statistical time series analysis of SAR data. This involves typically using about 18 months of data. Rather than using the persistent scatter method as used to determine sub-surface leak detection, in this case a short baseline assessment (SBAS) method is applied to determine the vertical terrain movement.

SBAS may involve the following steps. Initially an interferogram is generated, as in the persistent scattered methods described herein. Refinement and re-flattening is then carried out which involves the identification of ground control points, a digital elevation model and the precise orbital ephemeris data acquired (e.g. from ESA data) to refine the orbits (i.e. correcting possible inaccuracies) and to calculate the phase offset to derive the absolute phase values. A first inversion is then performed, and the re-flattened interferograms, together with the phase-height pair-by-pair proportionality factors are used to estimate the residual height and the displacement related information. These components are removed from the re-flattened interferograms before the unwrapping process takes place. A second inversion is then performed. The second inversion is implemented to derive the date by date displacements, which are filtered to remove the atmospheric phase components and eventually fit the final displacement velocity model. Finally geocoding is then carried out, as in the persistent scatter methods already described.

Figure 16:
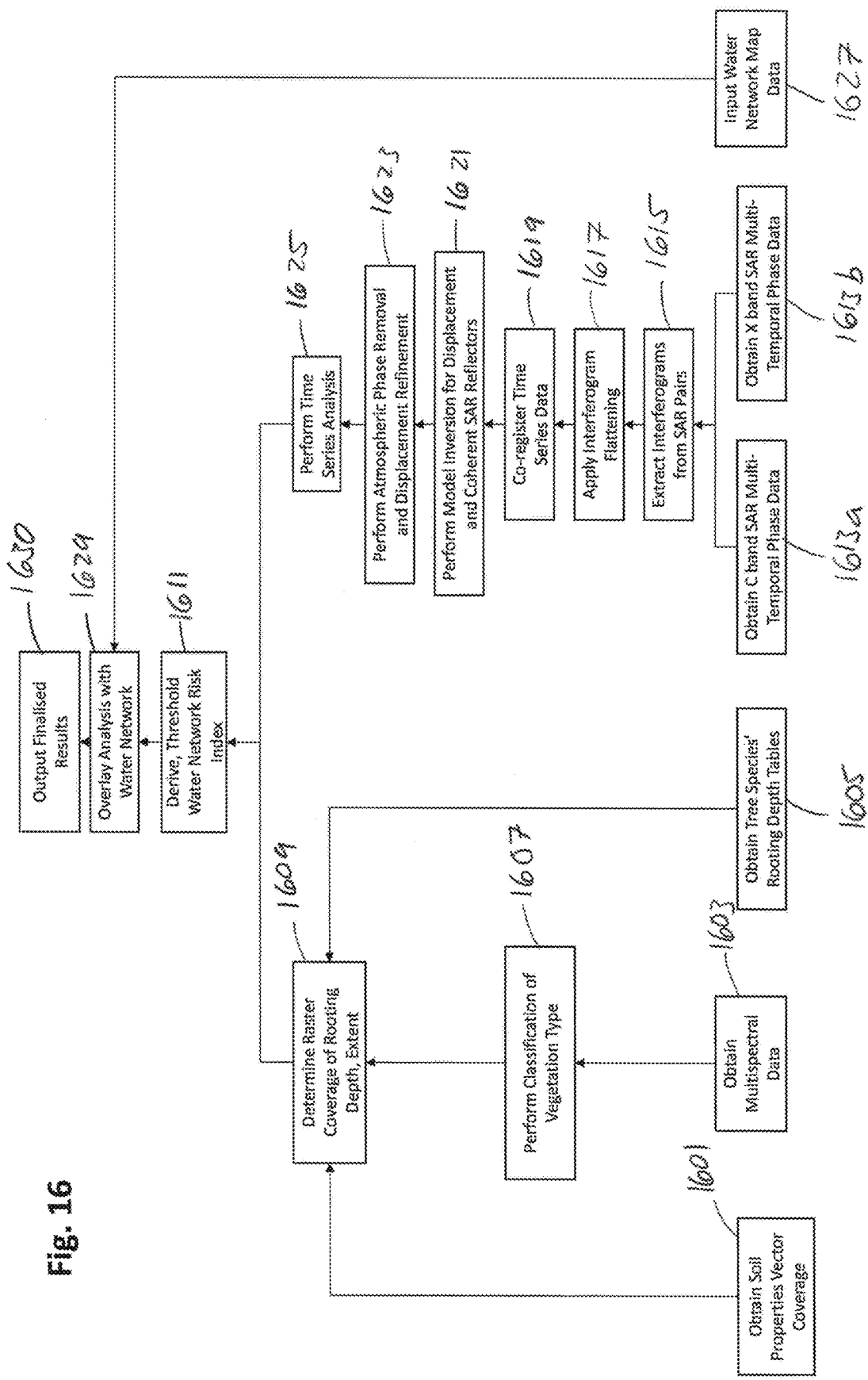
FIG. 16 is a flow chart showing an example method for monitoring a water network to determine a risk index using the water network monitoring system.

An example method used to detect the likelihood of a water network leakage occurring, by determining a risk index, as carried out by the water network monitoring system 100 is shown in FIG. 16.

Steps 1601 to 1609 involve generating an estimate of vegetation intrusion as set out in step 1305 of FIG. 13.

In the method shown in FIG. 16 at 1601 the physical attributes of the soil at one or more depths are obtained by analysis module from database 217. As shown this includes soil properties as a vector coverage, as is commonly known in geographic information systems (GIS). This may include how the texture of the soil is known to change at different depths. In some cases this may be data that is known from geographical surveys of the area that are maintained in an external database 217. In other cases the water network monitoring system 100 may contain this information. Water network monitoring system 100 in some embodiments may measure this information.

Multispectral data is then obtained by detector module at step 1603 to detect the vegetation that is present within the geographical region of interest. Preferably, this is multispectral optical data. Although it can be understood that any type of imagery that permits the determination of vegetation may be used. The multispectral data is sent by detector module to analysis module 209 in order to perform the classification of the vegetation type in the geographical area under investigation. For instance, this may involve classifying if the vegetation is woodland, grassland or shrubland. Areas with high levels of certain vegetation, such as woodland may have an increased risk of vegetation intrusion. The classification of vegetation may in some instances be more specific as to the exact type of vegetation. For instance, the identification of tree species may be performed. For instance, if the woodland is predominantly oak, or ash, or any other type of tree species.

At step 1609 the analysis module 209, based on the type of vegetation identified in the geographical area in step 1607, can obtain from database 217 physical attributes of types of vegetation 1605. As shown this involves typical root depths for different tree species. This is then combined with the details of the soil properties at various depths to determine the likelihood of vegetation intrusion.

Steps 1613 to 1625 involve monitoring an amount of terrain motion around the water network as set out in step 1307 of FIG. 13.

As can be seen steps 1613 to 1625 correspond to steps 1201 to 1213 of FIG. 12 used to determine terrain motion from sub-surface leaks. The description of these steps will not be described in detail here as the same discussion as provided above applies.

Steps 1613 to 1625 may differ from steps 1201 to 1213, as rather than the Persistent Scattering method as commonly known in the art they involve Short Baseline Assessment (SBAS) method, which involves the initial determination by analysis module 209 of a baseline for terrain position from the SAR data. As the skilled person would understand, SBAS may also be used for detecting sub-surface leaks.

Once the analysis module 209 has received the details of the vegetation intrusion and terrain motion at step 1611 it can derive a threshold water network risk index. Overlay analysis is then performed with the water network by overlay module 213 using the water network map data input. At the final stage the display module 215 then receives this information the finalised results are then output 1630 and with the risk index displayed to the user.

The risk index may be categorized into a plurality of categories. This may include high, medium, and low risk categories, where high risk indicates regions where water network leakage is likely to occur. The risk index may be displayed to the user in a graphical display with colour or greyscale indicating the risk category. This risk index may be displayed in any way as described above in relation to the water network leak detection methods.

The risk index may require calibration and testing to determine its reliability. This may involve the analysis module 209 using water network leaks detected by water network monitoring system 100, using the methods described above. The presence of surface, near surface and sub-surface leaks detected by water network monitoring system 100 may be compared to the risk index to validate it, as these leaks would be expected in regions with high risk index.

Although using details of the physical properties of the water network is not shown within FIG. 16, it can be understood that this information can be incorporated at any step when deriving the water network risk index. Thus, physical properties of the water network may be used at step 1611 along with the terrain motion and vegetation intrusion to develop the risk index. Alternatively, the physical properties of the water network may be used at step 1609 to estimate the vegetation intrusion. In other instances, physical properties of the water network may be used at step 1625 when performing the statistical time series analysis to determine if terrain motion is likely to have an effect on the water network.

The methods described herein may be encoded as executable instructions embodied in a computer readable medium, including, without limitation, non-transitory computer-readable storage, a storage device, and/or a memory device. Such instructions, when executed by a processor (or one or more computers, processors, and/or other devices) cause the processor (the one or more computers, processors, and/or other devices) to perform at least a portion of the methods described herein. A non-transitory computer-readable storage medium includes, but is not limited to, volatile memory, non-volatile memory, magnetic and optical storage devices such as disk drives, magnetic tape, compact discs (CDs), digital versatile discs (DVDs), or other media that are capable of storing code and/or data.

Where a processor is referred to herein, this is to be understood to refer to a single processor or multiple processors operably connected to one another. Similarly, where a memory is referred to herein, this is to be understood to refer to a single memory or multiple memories operably connected to one another.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, network personal computers (PCs), minicomputers, mainframe computers, distributed computing environments that include any of the above systems or devices, and the like. Hardware modules or apparatuses described in this disclosure include, but are not limited to, application-specific integrated circuits (ASICs); field-programmable gate arrays (FPGAs), dedicated or shared processors, and/or other hardware modules or apparatuses.

Receivers and transmitters as described herein may be standalone or may be comprised in transceivers. A communication link as described herein comprises at least one transmitter capable of transmitting data to at least one receiver over one or more wired or wireless communication channels. Such a communication link can optionally further comprise one or more relaying transceivers.

User input devices can include, without limitation, microphones, buttons, keypads, touchscreens, touchpads, trackballs, joysticks and mice. User output devices can include, without limitation, speakers, graphical user interfaces, indicator lights and refreshable braille displays. User interface devices can comprise one or more user input devices, one or more user output devices, or both.

Other embodiments will be apparent to those skilled in the art from consideration of the specification and practice of the embodiments disclosed herein. It is intended that the specification and examples be considered as exemplary only.

In addition, where this application has listed the steps of a method or procedure in a specific order, it could be possible, or even expedient in certain circumstances, to change the order in which some steps are performed, and it is intended that the particular steps of the method or procedure claims set forth herein not be construed as being order-specific unless such order specificity is expressly stated in the claim. That is, the operations/steps may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

It should be understood that the steps for detecting each of these types of leaks should not be limited to only detecting the specific type of leak mentioned. The skilled person would understand that any type of water network leak may be detected by any combination of the above steps.

Although it has been described that vertical terrain motion can be detected to indicate the presence of sub-surface leaks, in other situations the motion could be horizontal motion, or a combination of both horizontal and vertical motion. Although it has been described that persistent scatter method can be used to determine sub-surface leaks, it can be understood that SBAS or other techniques to determine terrain motion may also be used. Furthermore, as it was shown that SBAS can be used for determining the risk index, it can be understood that persistent scatters or other techniques to determine terrain motion may also be used.

External database 217 has been discussed in association with the above methods. However, it should be understood that external database 217 may actually be a database located within the water network monitoring system 100, rather than external to it. Furthermore, external database 217 may actually be a plurality of different databases. Each of the plurality of different databases may be maintained by distinct entities.

The SAR and optical data described herein may be acquired using any known method. In some embodiments they may be provided by an external organisation such as NASA or the European Space Agency. These images may be obtained from satellites such as Sentinel 1.

The time series SAR and/or optical data may be acquired at various time periods. For instance, the measurements may be acquired over a matter of days, weeks, months, or even years. These measurements may be made periodically. Alternatively, where satellite data is only available sporadically this data may be used.

Optical data may be any of visible, UV, IR, data. Alternatively, any other type of electromagnetic radiation may be used. For instance, radio waves may be used. The above methods are not limited where they recite SAR and optical data, and any type of observational data may be substituted as the skilled person would understand.

It has been described above that amplitude SAR data is used to detect the presence of surface leaks, and phase data is used to determine soil moisture (i.e. near-surface.) and terrain motion (i.e. sub-surface and risk index). However, this is not necessarily limiting and any of phase or amplitude SAR data may be used to detect the different types of leaks and/or risk index.

The use of Earth observational data with spatial resolution >1 m and modest update frequency is best suited to larger leaks developing over time rather than small events or bursts. These are the types of leaks that are of most interest to the water utilities companies. However, using an observation system with an increased resolution and acquiring data more frequently would enable the system to detect leaks of a small size if necessary.

The data presented to the user, such as the identification of leaks, and the risk index, may be presented in any way that would be known to the skilled person. For instance, it may be presented to the user in the form of an overlay on a map of the graphical area, as described above. The presence of leaks from each of the different methods may in some embodiments be displayed to the user within one display. For instance, this may involve the indication of surface, near surface, and sub-surface leaks being presented to the user on the same map. This may involve having a toggle allowing the user to determine which of the types of leaks are displayed on the map. The risk index may also be added to the display. This may also have the ability to be toggled on and off.

Although this system has been described in relation to detecting water network leaks, it should be understood not to be limited as such. The system may find use for identifying other types of leaks, for instance oil networks, or networks carrying other types of liquids, or for determining the likelihood of these networks leaking.

What is claimed is:

1. A method for monitoring a water network, the method comprising:

obtaining, by a processor of a water network monitoring system, using a Synthetic Aperture Radar (SAR) detector, a set of SAR data for a geographic region over a period of time;

obtaining, by the processor of the water network monitoring system, from an optical detector, a set of optical data of the geographic region over the period of time, the set of optical data containing at least a portion of the water network;

generating, by the processor of the water network monitoring system, an estimate of vegetation intrusion into the water network over the period of time based at least in part on the obtained set of optical data;

monitoring, by the processor of the water network monitoring system, an amount of terrain motion around the water network over the period of time based at least in part on one or both of the obtained set of SAR data and the obtained set of optical data;

generating, by the processor of the water network monitoring system, a leakage risk index based at least in part on the estimate of vegetation intrusion into the water network and the monitoring of the amount of terrain motion around the water network; and presenting, by the processor of the water network monitoring system, through a display, a graphical user interface (GUI) identifying one or more locations in the water network having potential leaks based on the generated leakage risk index.

2. The method of claim 1, wherein generating the estimate of vegetation intrusion into the water network comprises:
reading a set of data defining one or more physical attributes for soil at one or more depths and at the one or more locations along the water network;
reading a set of data defining one or more physical attributes for one or more types of vegetation;
classifying vegetation at the one or more locations along the water network based on the obtained set of optical data; and
generating an estimated amount of vegetation intrusion at each of the one or more locations along the water network based on the one or more physical attributes of the soil, and the one or more physical attributes for a type of the classified vegetation at each location.

3. The method of claim 1, wherein the generating the leakage risk index is based at least in part on data defining one or more physical attributes of the water network at one or more locations in the geographic region.

4. The method of claim 1, wherein monitoring the amount of terrain motion around the water network comprises:
integrating data of the obtained set of SAR data using one or more interferometric processes that quantify vertical terrain movement at one or more locations within the geographic region corresponding to locations of the water network;
creating a time series history using the vertical terrain movement at the one or more locations within the geographic region; and
identifying, based on the time series history, locations of the one or more locations within the geographic region having vertical terrain movement exceeding one or more threshold values.

5. The method of claim 1, wherein generating the leakage risk index further comprises:
reading a set of data defining one or more threshold values for each of the generated estimate of vegetation intrusion into the water network and the amount of terrain motion around the water network; and
assigning a risk category to one or more locations along the water network based on a value for the generated estimate of vegetation intrusion into the water network or a value for the amount of terrain motion around the water network exceeding one or more of the threshold values.

6. A system comprising:
a display;
a processor coupled with the display; and
a memory coupled with and readable by the processor and storing therein a set of instructions which, when executed by the processor, causes the processor to monitor a water network by:
obtaining, using a Synthetic Aperture Radar (SAR) detector, a set of SAR data for a geographic region over a period of time, the set of SAR data containing at least a portion of the water network;
obtaining, from an optical detector, a set of optical data of the geographic region over the period of time;
analyzing the obtained set of SAR data and the obtained set of optical data for spatial or temporal anomalies related to a plurality of indirect indicators of leaks in the water network;
detecting, based on the analyzing of the obtained set of SAR data and the obtained set of optical data, one or more spatial or temporal anomalies related to at least one of the plurality of indirect indicators of leaks in the water network and not attributable to environmental factors within the geographic region;
generating a set of graded locations within the geographic region having symptoms associated with leaks in the water network based on the detected one or more spatial or temporal anomalies;
determining a risk of leakage by:
generating an estimate of vegetation intrusion into the water network over the period of time based at least in part on the obtained set of optical data,
monitoring an amount of terrain motion around the water network over the period of time based at least in part on one or both of the obtained set of SAR data and the obtained set of optical data, and
generating a leakage risk index based at least in part on the estimate of vegetation intrusion into the water network and the monitoring of the amount of terrain motion around the water network; and
presenting, through the display, a Graphical User Interface (GUI) identifying one or more locations in the water network having potential leaks based on the generated leakage risk index.

7. The system of claim 6, wherein the plurality of indirect indicators of leaks in the water network comprises two or more of an indicator of soil moisture or ponding water derived based on the obtained set of SAR data, an indicator of vegetation growth derived based on the obtained set of optical data, or an indicator of surface motion or texture change derived based on the obtained set of SAR data.

8. The system of claim 6, further comprising detecting, by the water network monitoring system and based on the one or more spatial or temporal anomalies, one or more surface leaks in the water network, the surface leaks comprising a leak of the water network causing ponding of water on a ground surface and wherein detecting the one or more surface leaks in the water network further comprises:
filtering noise from the obtained set of SAR data using a multi-temporal filter;
identifying one or more locations within the geographic region and corresponding to locations of the water network where the filtered SAR data indicates a drop in backscattered energy relative to at least one previous monitoring period;
plotting the identified one or more locations spatially in a graphical representation of the geographic region;
overlaying the graphical representation of the geographic region with the plotted one or more locations onto one or more images of the obtained optical data; and
filtering the plotted one or more locations based on the one or more images to filter out false positives.

9. The system of claim 6, further comprising detecting, by the water network monitoring system and based on the one or more spatial or temporal anomalies, one or more near-surface leaks in the water network, the near-surface leaks comprising a leak of the water network causing water to spread below a ground surface and at or above a level of the water network and wherein detecting the one or more near-surface leaks in the water network further comprises:
reading a set of data defining statistical relationships between soil moisture content, SAR interferometric coherence variables and polarimetric decomposition variables obtained from a calibration area of the geographical region;
applying the statistical relationships using interferometric coherence variables and polarimetric decomposition variables obtained from SAR data related to portions of the geographic region overlaying the water network using spatial extrapolation to determine a soil moisture content for a plurality of locations in the geographic region; and identifying one or more locations of the plurality of locations in the geographic region having a determined soil moisture content exceeding one or more threshold values.

10. The system of claim 9, further comprising creating a set of data defining statistical relationships between soil moisture content SAR interferometric coherence variables and polarimetric decomposition variables obtained from a calibration area of the geographic region.

11. The system of claim 6, further comprising detecting, by the water network monitoring system and based on the one or more spatial or temporal anomalies, one or more sub-surface leaks in the water network, the sub-surface leaks comprising a leak of the water network causing water to spread below a ground surface and below a level of the water network and wherein detecting the one or more sub-surface leaks in the water network further comprises:

integrating data of the obtained set of SAR data using one or more interferometric processes that quantify vertical terrain movement at one or more locations within the geographic region corresponding to locations of the water network;

creating a time series history using the vertical terrain movement at the one or more locations within the geographic region; and identifying, based on the time series history, locations of the one or more locations within the geographic region having vertical terrain movement exceeding one or more threshold values.

12. The system of claim 6, wherein generating the estimate of vegetation intrusion into the water network comprises:

reading a set of data defining one or more physical attributes for soil at one or more depths and at the one or more locations along the water network;

reading a set of data defining one or more physical attributes for one or more types of vegetation;

classifying vegetation at the one or more locations along the water network based on the obtained set of optical data; and generating an estimated amount of vegetation intrusion at each of the one or more locations along the water network based on the one or more physical attributes of the soil, and the one or more physical attributes for a type of the classified vegetation at each location.

13. The system of claim 6, wherein the generating the leakage risk index is based at least in part on data defining one or more physical attributes of the water network at one or more locations in the geographic region.

14. The system of claim 6, wherein monitoring the amount of terrain motion around the water network comprises:

integrating data of the obtained set of SAR data using one or more interferometric processes that quantify vertical terrain movement at one or more locations within the geographic region corresponding to locations of the water network;

creating a time series history using the vertical terrain movement at the one or more locations within the geographic region; and identifying, based on the time series history, locations of the one or more locations within the geographic region having vertical terrain movement exceeding one or more threshold values.

15. The system of claim 6, wherein generating the leakage risk index further comprises:

reading a set of data defining one or more threshold values for each of the generated estimate of vegetation intrusion into the water network and the amount of terrain motion around the water network; and assigning a risk category to one or more locations along the water network based on a value for the generated estimate of vegetation intrusion into the water network or a value for the amount of terrain motion around the water network exceeding one or more of the threshold values.

16. A non-transitory computer-readable medium comprising a set of instructions stored therein which, when executed by a processor, causes the processor to monitor a water network by:

obtaining, through a Synthetic Aperture Radar (SAR) detector, a set of SAR data for a geographic region over a period of time, the set of SAR data containing at least a portion of the water network;

obtaining, through an optical detector, a set of optical data of the geographic region over the period of time;

analyzing the obtained set of SAR data and the obtained set of optical data for spatial or temporal anomalies related to a plurality of indirect indicators of leaks in the water network, wherein the plurality of indirect indicators of leaks in the water network comprises two or more of an indicator of soil moisture or ponding water derived based on the obtained set of SAR data, an indicator of vegetation growth derived based on the obtained set of optical data, or an indicator of surface motion or texture change derived based on the obtained set of SAR data;

detecting, based on the analyzing of the obtained set of SAR data and the obtained set of optical data, one or more spatial or temporal anomalies related to at least one of the plurality of indirect indicators of leaks in the water network and not attributable to environmental factors within the geographic region;

generating a set of graded locations within the geographic region having symptoms associated with leaks in the water network based on the detected one or more spatial or temporal anomalies;

generating an estimate of vegetation intrusion into the water network over the period of time based at least in part on the obtained set of optical data;

monitoring an amount of terrain motion around the water network over the period of time based at least in part on one or both of the obtained set of SAR data and the obtained set of optical data;

generating a leakage risk index based at least in part on the estimate of vegetation intrusion into the water network and the monitoring of the amount of terrain motion around the water network; and presenting, through a display, a Graphical User Interface (GUI) identifying one or more locations in the water network having potential leaks based on the generated leakage risk index.

17. The non-transitory computer-readable medium of claim 16, further comprising detecting, by the water network monitoring system and based on the one or more spatial or temporal anomalies, one or more surface leaks in the water network, the surface leaks comprising a leak of the water network causing ponding of water on a ground surface and wherein detecting the one or more surface leaks in the water network further comprises:

filtering noise from the obtained set of SAR data using a multi-temporal filter;

identifying one or more locations within the geographic region and corresponding to locations of the water network where the filtered SAR data indicates a drop in backscattered energy relative to at least one previous monitoring period;

plotting the identified one or more locations spatially in a graphical representation of the geographic region;

overlaying the graphical representation of the geographic region with the plotted one or more locations onto one or more images of the obtained optical data; and filtering the plotted one or more locations based on the one or more data to filter out false positives.

18. The non-transitory computer-readable medium of claim 16, further comprising detecting, by the water network monitoring system and based on the one or more spatial or temporal anomalies, one or more near-surface leaks in the water network, the near-surface leaks comprising a leak of the water network causing water to spread below a ground surface and at or above a level of the water network and wherein detecting the one or more near-surface leaks in the water network further comprises:

reading a set of data defining statistical relationships between soil moisture content, SAR interferometric coherence variables and polarimetric decomposition variables obtained from a calibration area of the geographical region;

applying the statistical relationships using interferometric coherence variables and polarimetric decomposition variables obtained from SAR data related to portions of the geographic region overlaying the water network using spatial extrapolation to determine a soil moisture content for a plurality of locations in the geographic region; and identifying one or more locations of the plurality of locations in the geographic region having a determined soil moisture content exceeding one or more threshold values.

19. The non-transitory computer-readable medium of claim 18, further comprising creating a set of data defining statistical relationships between soil moisture content SAR interferometric coherence variables and polarimetric decomposition variables obtained from a calibration area of the geographic region.

20. The non-transitory computer-readable medium of claim 16, further comprising detecting, by the water network monitoring system and based on the one or more spatial or temporal anomalies, one or more sub-surface leaks in the water network, the sub-surface leaks comprising a leak of the water network causing water to spread below a ground surface and below a level of the water network and wherein detecting the one or more sub-surface leaks in the water network further comprises:

integrating data of the obtained set of SAR data using one or more interferometric processes that quantify vertical terrain movement at one or more locations within the geographic region corresponding to locations of the water network;

creating a time series history using the vertical terrain movement at the one or more locations within the geographic region; and identifying, based on the time series history, locations of the one or more locations within the geographic region having vertical terrain movement exceeding one or more threshold values.

21. The non-transitory computer-readable medium of claim 16, wherein generating the estimate of vegetation intrusion into the water network comprises:

reading a set of data defining one or more physical attributes for soil at one or more depths and at the one or more locations along the water network;

reading a set of data defining one or more physical attributes for one or more types of vegetation;

classifying vegetation at the one or more locations along the water network based on the obtained set of optical data; and generating an estimated amount of vegetation intrusion at each of the one or more locations along the water network based on the one or more physical attributes of the water network, the one or more physical attributes of the soil, and the one or more physical attributes for a type of the classified vegetation at each location.

22. The non-transitory computer-readable medium of claim 16, wherein the generating the leakage risk index is based at least in part on data defining one or more physical attributes of the water network at one or more locations in the geographic region.

23. The non-transitory computer-readable medium of claim 16, wherein monitoring the amount of terrain motion around the water network comprises:

integrating data of the obtained set of SAR data using one or more interferometric processes that quantify vertical terrain movement at one or more locations within the geographic region corresponding to locations of the water network;

creating a time series history using the vertical terrain movement at the one or more locations within the geographic region; and identifying, based on the time series history, locations of the one or more locations within the geographic region having vertical terrain movement exceeding one or more threshold values.

24. The non-transitory computer-readable medium of claim 16, wherein generating the leakage risk index further comprises:

reading a set of data defining one or more threshold values for each of the generated estimate of vegetation intrusion into the water network and the amount of terrain motion around the water network; and assigning a risk category to one or more locations along the water network based on a value for the generated estimate of vegetation intrusion into the water network or a value for the amount of terrain motion around the water network exceeding one or more of the threshold values.

25. A water network monitoring system comprising:
a display;
a processor coupled with the display; and
a memory coupled with and readable by the processor and storing therein a set of instructions which, when executed by the processor, causes the processor to monitor a water network by:

obtaining, using a Synthetic Aperture Radar (SAR) detector, a set of SAR data for a geographic region over a period of time;

obtaining, from an optical detector, a set of optical data of the geographic region over the period of time, the set of optical data containing at least a portion of the water network;
generating an estimate of vegetation intrusion into the water network over the period of time based at least in part on the obtained set of optical data;
monitoring an amount of terrain motion around the water network over the period of time based at least in part on one or both of the obtained set of SAR data and the obtained set of optical data;
generating a leakage risk index based at least in part on the estimate of vegetation intrusion into the water network and the monitoring of the amount of terrain motion around the water network; and
presenting, through the display, a Graphical User Interface (GUI) identifying one or more locations in the water network having potential leaks based on the generated leakage risk index.

26. The water network monitoring system of claim 25, wherein generating the estimate of vegetation intrusion into the water network comprises:
reading a set of data defining one or more physical attributes for soil at one or more depths and at the one or more locations along the water network;
reading a set of data defining one or more physical attributes for one or more types of vegetation;
classifying vegetation at the one or more locations along the water network based on the obtained set of optical data; and
generating an estimated amount of vegetation intrusion at each of the one or more locations along the water network based on the one or more physical attributes of the soil, and the one or more physical attributes for a type of the classified vegetation at each location.

27. The water network monitoring system of claim 25, wherein the generating the leakage risk index is based at least in part on data defining one or more physical attributes of the water network at one or more locations in the geographic region.

28. The water network monitoring system of claim 25, wherein monitoring the amount of terrain motion around the water network comprises:
integrating data of the obtained set of SAR data using one or more interferometric processes that quantify vertical terrain movement at one or more locations within the geographic region corresponding to locations of the water network;
creating a time series history using the vertical terrain movement at the one or more locations within the geographic region; and
identifying, based on the time series history, locations of the one or more locations within the geographic region having vertical terrain movement exceeding one or more threshold values.

29. The water network monitoring system of claim 25, wherein generating the leakage risk index further comprises:
reading a set of data defining one or more threshold values for each of the generated estimate of vegetation intrusion into the water network and the amount of terrain motion around the water network; and
assigning a risk category to one or more locations along the water network based on a value for the generated estimate of vegetation intrusion into the water network or a value for the amount of terrain motion around the water network exceeding one or more of the threshold values.

* * * * *